US012809424B2

(12) United States Patent
Singh et al.

(10) Patent No.: US 12,809,424 B2
(45) Date of Patent: Nov. 24, 2026

(54) SYSTEM AND METHOD FOR MITIGATION OF AN ELECTROMAGNETIC FIELD (EMF) AT AN INFORMATION HANDLING SYSTEM USING A METASURFACE

(71) Applicant: Dell Products LP, Round Rock, TX (US)

(72) Inventors: Tejinder Singh, Manotick (CA); Navjot Kaur Khaira, Manotick (CA); Harpreet S. Narula, Austin, TX (US)

(73) Assignee: DELL PRODUCTS LP, Round Rock, TX (US)

(*) Notice: Subject to any disclaimer, the term of this patent is extended or adjusted under 35 U.S.C. 154(b) by 122 days.

(21) Appl. No.: 19/033,074

(22) Filed: Jan. 21, 2025

(65) Prior Publication Data

US 2026/0211456 A1 Jul. 23, 2026

(51) Int. Cl.

*H01Q 1/22* (2006.01)
*G06F 1/16* (2006.01)
*H01Q 1/24* (2006.01)

(52) U.S. Cl.

CPC .......... *G06F 1/1656* (2013.01); *G06F 1/1616* (2013.01); *H01Q 1/2266* (2013.01)

(58) Field of Classification Search

CPC .......... H01Q 1/22; H01Q 1/2266; H01Q 1/24; H01Q 1/243

See application file for complete search history.

(56) References Cited

U.S. PATENT DOCUMENTS

| | | | |
|---|---|---|---|
| 10,915,002 | B2 | 2/2021 | Akselrod |
| 2018/0241131 | A1 | 8/2018 | Akselrod |
| 2020/0025619 | A1 | 1/2020 | Almasri |
| 2020/0227632 | A1 | 7/2020 | Kim |
| 2021/0028547 | A1 | 1/2021 | Falk |
| 2021/0048693 | A1 | 2/2021 | Falk |

(Continued)

FOREIGN PATENT DOCUMENTS

| | | | | |
|---|---|---|---|---|
| CN | 119210544 A | * | 12/2024 | ............ H04W 16/18 |
| CN | 119231186 A | * | 12/2024 | ............. H01Q 1/273 |

(Continued)

*Primary Examiner* — Hoang V Nguyen

(74) *Attorney, Agent, or Firm* — Prol Intellectual Property Law, PLLC; H. Kenneth Prol

(57) ABSTRACT

A system and method of mitigating an electromagnetic field (EMF) at a metasurface unit cell array formed on an information handling system includes with a hardware processor executing computer-readable program code instructions of an adaptive mitigation system module to receive received signal strength indicator (RSSI) data from an RSSI sensor, receive signal-to-interference-plus-noise ratio (SINR) data from an SINR sensor, or determine wireless bandwidth requirements at the information handling system, and with a tunable delay circuit, phase shift electromagnetic (EM) waves of a captured, incident radiofrequency signal to create interference patterns in the EM waves of the incident radiofrequency signals with a reflected radiofrequency signal at the metasurface unit cell array to create a null region of reduced EMF on one side of the information handling system for a user and reducing the null region when radiofrequency communication metrics indicate need for increased radiofrequency signal.

20 Claims, 9 Drawing Sheets

(56) References Cited

U.S. PATENT DOCUMENTS

| | | | | |
|---|---|---|---|---|
| 2021/0050515 | A1 | 2/2021 | Falk | |
| 2021/0336345 | A1 | 10/2021 | Falk | |
| 2022/0050354 | A1 | 2/2022 | Park | |
| 2022/0102863 | A1 | 3/2022 | Shekhar | |
| 2022/0196480 | A1 | 6/2022 | Ang | |
| 2022/0278738 | A1 | 9/2022 | Dai | |
| 2023/0027067 | A1 | 1/2023 | Liu | |
| 2023/0094688 | A1 | 3/2023 | Lai | |
| 2023/0318183 | A1* | 10/2023 | Oh | H01Q 9/0407<br>343/702 |
| 2024/0106515 | A1 | 3/2024 | Ly | |
| 2024/0154648 | A1 | 5/2024 | Elshafie | |
| 2024/0284522 | A1 | 8/2024 | Dutta | |

FOREIGN PATENT DOCUMENTS

| | | | |
|---|---|---|---|
| WO | 2020/136026 | A1 | 7/2020 |
| WO | WO/2023/152856 | A1 | 8/2023 |
| WO | 2023/220319 | A1 | 11/2023 |
| WO | 2024/182953 | A1 | 9/2024 |

* cited by examiner

SYSTEM AND METHOD FOR MITIGATION OF AN ELECTROMAGNETIC FIELD (EMF) AT AN INFORMATION HANDLING SYSTEM USING A METASURFACE

FIELD OF THE DISCLOSURE

The present disclosure generally relates to dynamic electromagnetic field (EMF) mitigation systems at an information handling system. More specifically, the present disclosure relates to a metasurface unit cell array integrated into an information handling system, such as a laptop, which employs phase cancellation techniques and adaptive attenuation amongst metasurface unit cells to minimize EMF exposure while maintaining wireless communication performance.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of a graphics processing unit to provide image and video data to the digital display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
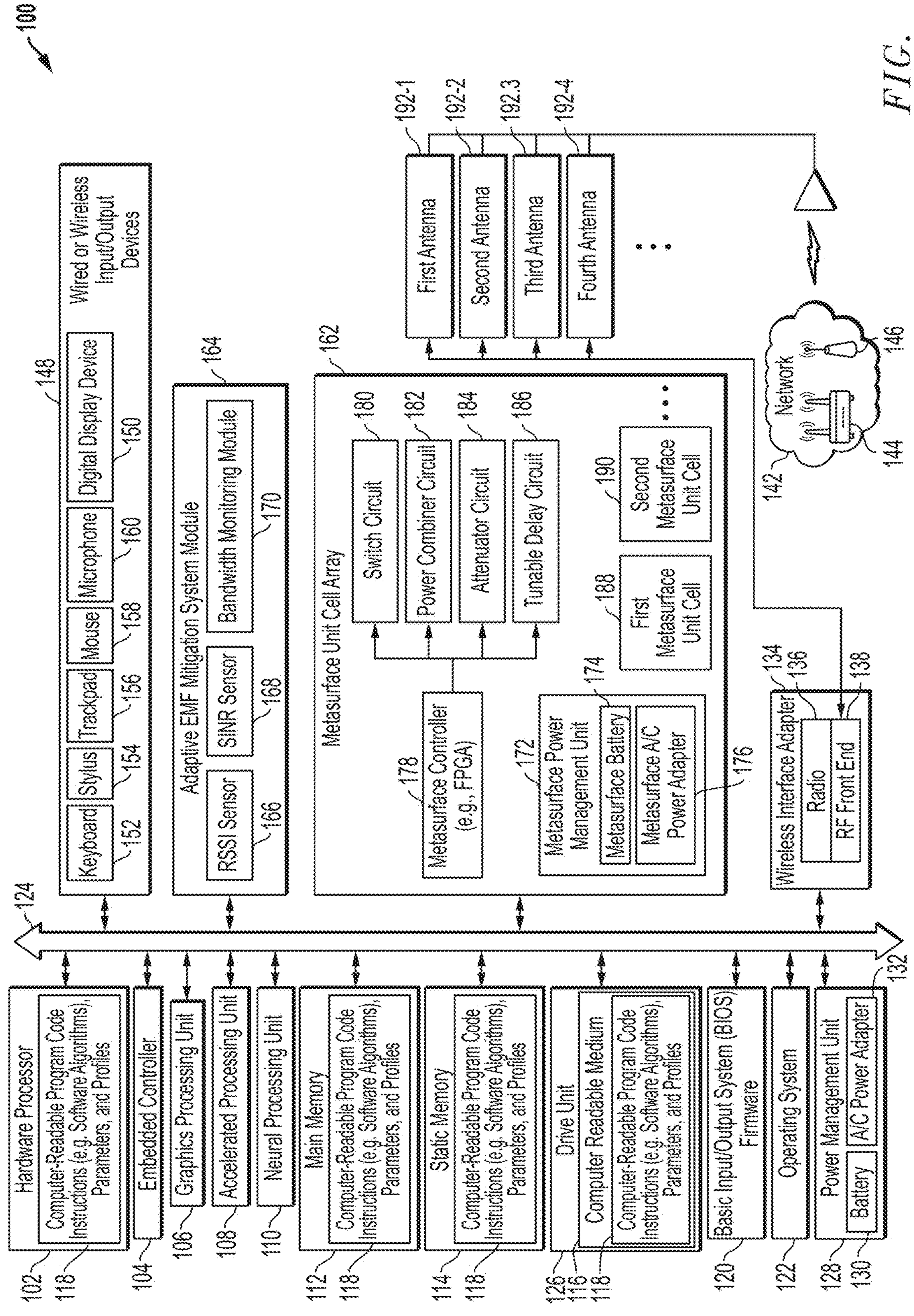
FIG. 1 is a block diagram illustrating an information handling system and a metasurface unit cell array comprising a plurality of metasurface unit cells operatively coupled to the information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Wireless data transmission from a transmitting device to a receiving device allows for rapid data transmission and communication between multiple devices. Devices may include wirelessly enabled information handling systems, access point devices, or any computing device, such as internet of things (IOT) devices that are wirelessly capable. As data transmission requirements increase, the electromagnetic (EM) wave (e.g., 5G technologies using 20 to 50 GHz wireless signals or other frequencies, or WiFi 6 signals at 2.4 GHz, 5 GHz or even 6 GHz) used to transmit these ever-increasing amounts of data are shortened or may benefit from extended range such as reach around radiofrequency barriers such as walls. However, the ability to penetrate walls and building structures as well as transmit around these relatively large structures may be limited with such wireless systems. Additionally, material properties of these buildings and other structures effect reflection from, and transmission of, EM waves through building materials and on the absorption of EM wave energy in those materials, which gives rise to attenuation of the EM signal. Other EM wave-inhibiting mechanisms include diffraction from the edges of materials and scatter from rough edges also exist in radiofrequency environments such as rooms within a building. Further, most buildings behave as lossy dielectrics as building materials as well as occasionally conductive material that further inhibit or scatter EM wave propagation.

With the advent of massive multiple input multiple output (MIMO) wireless technologies, a group of antennas at both the transmitting device and receiving device may provide high spectral and energy efficient wireless communication systems. However, with these high spectral transmitting and receiving devices such as 2.4, 5, and 6 GHz antennas and 5G-NR antennas, electromagnetic field (EMF) exposure may be a concern. Modern information handling systems such as laptops may continuously transceive high-power wireless signals in order to maintain connectivity to the internet or other wireless devices. This may lead to a significant level of EMF exposure to the user of the information handling system leading to potential health concerns. Additionally, there is no current wireless solution in laptop-type information handling systems that provide for dynamic adaptation to changing conditions and user needs relative to EMF exposure resulting in ineffective power usage at the information handling system and unnecessary EMF exposure.

In an attempt to alleviate these issues, some manufacturers have created tech-shields such as laptop cases and phone covers that include EMF blocking materials like silver and aluminum. These shields can block or reduce radiation emitted from electronic devices, thereby minimizing exposure to body parts, especially when using devices close to the body. While effective to some extent, these shields do not offer any real-time adjustment or optimization based on environmental conditions or user needs. Further, these tech-shields may impact radiofrequency signal transmission or reception variably depending on conditions. There currently is no system that provides for real-time control of EMF levels to protect the user from EMF exposure.

The present specification describes a system and method that mitigates EMF emitted from one or more antennas of the information handling system. The information handling system includes a hardware processor, a memory device, and a power management unit (PMU) to provide power to the hardware processor and memory device. The information handling system also includes an operatively coupled metasurface unit cell array to manipulate electromagnetic waves in the vicinity of the information handling system. The metasurface unit cell array may include a plurality of metasurface unit cells, each of the plurality of unit cells including a passive set of concentric circular antennas to receive incoming electromagnetic (EM) waves and a microwave circuit coupled to the set of concentric circular antennas via a passive coupler, the microwave circuit configured to receive EM waves from the concentric circular antennas and perform phase modulation of the received EM waves. The metasurface unit cells may include a conductive fixed tab within the concentric circular antennas in an embodiment. Further, while concentric circular antennas are discussed in embodiments herein, any shape of concentric antennas for the passive portions of the metasurface unit cell may be used. During operation, the hardware processor may execute computer-readable program code instructions of an adaptive mitigation system module to receive received signal strength indicator (RSSI) data from an RSSI sensor, receive signal-to-interference-plus-noise ratio (SINR) data from an SINR sensor, and determine wireless bandwidth requirements of radiofrequency signals at the information handling system. At a tunable delay circuit, the hardware processor may initiate a phase shift the EM waves to create interference patterns in the incoming EM waves to create a null region within the incoming EM waves or reflected outgoing EM waves when the metasurface unit cell array is placed in an electromagnetic field (EMF) mitigation mode.

In an embodiment, the metasurface unit cell array may be formed on a surface of an a-cover or outer display chassis cover of the information handling system, such as a laptop or tablet type information handling system, with one or more antennas formed around the periphery of the metasurface unit cell array. This allows the metasurface unit cell array to, through interference (constructive or destructive interference), create the null region in the EMF such that the user sitting before a display of the information handling system is not or is less frequently subjected to the EMF created by the antennas or received and reflected from the radiofrequency environment.

In an embodiment, the hardware processor may execute the computer-readable program code instructions of the adaptive mitigation system module to, at an attenuator circuit, reduce the amplitude of the EM waves within the null region created by operation of the tunable delay circuit. This further reduces the user sitting before the display of the information handling system from being subjected to the EMF. In an embodiment, a switch circuit may be included and actuated by the hardware processor to switch the metasurface unit cell array between the EMF mitigation mode and a signal control mode that results in a reduction of the effects of the attenuation circuit and reduces the phase shifting of the EM waves to allow for stronger radiofrequency signals when needed by the wireless communications of the information handling system.

In an embodiment, a signal matching circuit may be operatively coupled to each of the microwave circuits of the plurality of unit cells to match the impedance received from each of the plurality of microwave circuits prior to the tunable delay circuit phase shifting the EM waves. Additionally, in an embodiment, an impedance matching junction may be formed between each of the microwave circuits of the plurality of unit cells such that data from the microwave circuits may be passed to the signal matching circuit.

Thus, the presently-described metasurface unit cell array of embodiments herein is real-time configurable such that the metasurface unit cell array can selectively create null regions within an EMF. The methods and systems described herein using the metasurface unit cell array may dynamically adjust the phase of the metasurface unit cell array thereby creating the null regions to minimize EMF exposure to the user as well as reduce the overall EMF footprint around the information handling system. Unlike systems that use passive shielding materials, the presently described system and method incorporates an adaptive reconfigurable metasurface that selectively steers and enhances signal directionality and strength originating from the antennas in real-time. The inclusion of the adaptive attenuator circuit provides for the management of signal strength with the system described herein being capable of gradually adjusting the attenuator circuit and tunable delay circuit based on real-time bandwidth requirements and real-time wireless signal conditions at the information handling system.

Turning now to the figures, FIG. 1 illustrates an information handling system 100 similar to the information handling systems according to several aspects of the present disclosure that may operate as a source or target radiofrequency device for use with the reconfigurable metasurfaces of the embodiments of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system within a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term “system” shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Computer-readable program code instructions stored in static memory 114, main memory 112, or drive unit 126 may be involved in invoking such computer-readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a keyboard 152, a digital display device 150, a microphone 160, or any combination thereof. Portions of an information handling system 100 may themselves be considered information handling systems 100.

Information handling system 100 may include devices or modules that embody one or more of the devices or execute instructions for one or more systems and modules. The information handling system 100 may execute computer-readable program code instructions (e.g., software algorithms) parameters, and profiles 118 that may operate on servers or systems, remote data centers, or on-box in individual client information handling systems according to various embodiments herein. In some embodiments, it is understood any or all portions of computer-readable program code instructions (e.g., software algorithms) parameters, and profiles 118 may operate on a plurality of information handling systems 100.

The information handling system 100 may include the hardware processor 102 such as a central processing unit (CPU) or other hardware processing resource (e.g., 104, 106, 108, 110). Any of the hardware processing resources may operate to execute computer readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with computer readable medium 116 storing computer-readable program code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a keyboard 152, a mouse 158, digital display device 150, stylus 154, trackpad 156, microphone 160, among other peripheral devices.

As described herein, the information handling system 100 further includes a digital display device 150. The digital display device 150 in an embodiment may function as a liquid crystal display (LCD), an organic light emitting diode (OLED), a flat panel display, or a solid-state display. It is appreciated that the digital display device 150 may be wired or wireless and may be an external digital display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 152, among others that allows the user to interface with the information handling system 100 via the digital display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein. The present specification contemplates that the wired or wireless I/O devices 148 may be wired or wireless.

A network interface device of the information handling system 100 may be wired or wireless such as shown with wireless interface adapter 134 that can provide wireless connectivity among plural devices such as with Bluetooth® or to a network 142 such as with a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and one or more antennas 192-1, 192-2, 192-3, 192-4 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems. In the context of the present disclosure the one or more antennas 192-1, 192-2, 192-3, 192-4 may include one or more WiFi antennas operating at 2.4 GHz, 5 GHZ, and/or 6 GHz frequencies, one or more Bluetooth antennas, and one or more 5G new radio (5G-NR) antennas that operate at Frequency Range 1 (FR1) (which includes sub-7 GHz frequency bands and those from 410 MHz to 7125 MHz0 and Frequency Range 2 (FR2) (which includes frequency bands from 24.25 GHz to 71.0 GHz frequency bands). It is appreciated that the one or more antennas 192-1, 192-2, 192-3, 192-4 may support any frequency or frequency range and the present specification appreciates the use of these other types of antennas 192-1, 192-2, 192-3, 192-4 to be formed on a periphery of the metasurface unit cell array 162.

In other embodiments, the wireless interface device 134 with its radio 136, RF front end 138 and antennas 192-1, 192-2, 192-3, 192-4 are used to communicate with a WWAN or and WLAN which may each include an AP 144 or base station 146 used to operatively couple the information handling system 100 to a network 142 via the wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 192-1, 192-2, 192-3, 192-4 and other circuitry of the radio 136 such as one or more antenna ports used for wireless communications via multiple radio access technologies (RATs). The radio 136 may communicate with one or more wireless technology protocols. It is appreciated that the information handling system 100 may wirelessly communicate with a target receiver device 178 via the reconfigurable metasurface unit cell array 162. The receiver device 178 may be any other device and may include the AP 144, the base station 146, or any other computing device described herein. Additionally, the information handling system 100 and receiver device 178 may be capable of transmitting wireless data using, for example, EM waves that include 5G mm wave lengths such as those included within the 20-50 GHz range or WiFi wavelengths such as 2.4 GHz, 5 GHz, 6 GHz or others to be used with later versions of WiFi. Thus, in an embodiment, the reconfigurable metasurface unit cell array 162 is capable of relaying these types of mm waves.

In an embodiment, the wireless interface adapter 134 may operate in accordance with any wireless data communication standards. To communicate with a wireless local area network and/or the receiver device 178, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes computer-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit (ASIC). Accordingly, the present system encompasses a hardware processing resource executing computer-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable program code instructions, parameters, and profiles 118 or receives and executes computer-readable program code instructions, parameters, and profiles 118 responsive to a propagated signal, so that a hardware device connected to a network 142 may communicate voice, video, or data over the network 142. Further, the computer-readable program code instructions, parameters, and profiles 118 may be transmitted or received over the network 142 via the network interface device or wireless interface adapter 134.

The information handling system 100 may include a set of computer-readable program code instructions, parameters, and profiles 118 that may be executed to cause the computer system to perform any one or more of the methods or computer-based functions disclosed herein. For example, computer-readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application computer-readable program code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, the video/graphic display device 150, or other wired or wireless I/O devices 148 such as the mouse 158, the stylus 154, the keyboard 152, and the trackpad 156 and other components that may require power when a power button has been actuated by a user. In an embodiment, the PMU 128 may monitor power levels and be electrically coupled to the information handling system 100 in embodiments herein to provide this power. The PMU 128 may be coupled to the bus 124 to provide or receive data or machine-readable code instructions. The PMU 128 may regulate power from a power source such as the battery 130, or AC power adapter 132. In an embodiment, the battery 130 may be charged via the AC power adapter 132 and provide power to the components of the information handling system 100, via wired connections, or when AC power from the AC power adapter 132 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 116 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses hardware resources executing software or firmware, as well as hardware implementations.

As described herein, the information handling system 100 may include a metasurface unit cell array 162. In an embodiment, the metasurface unit cell array 162 may be affixed to a display chassis cover of the laptop-type information handling system 100 such as the A-cover of a laptop type information handling system or the back of a tablet type information handling system. The A-cover may include a top portion of the lid of the laptop-type information handling system 100 housing an integrated digital display device 150, for example. The placement of the metasurface unit cell array 162 on the A-cover of the laptop-type information handling system 100 or the back of a tablet-type information handling system 100 may allow those electromagnetic fields (EMFs) generated by the EM waves that are received and transmitted by the one or more antennas 192-1, 192-2, 192-3, 192-4 to be controlled. As described herein, the metasurface unit cell array 162 may be used to create a null region within the generated EMFs at or around the user to reduce EMF exposure from the one or more antennas 192-1, 192-2, 192-3, 192-4 or from radiofrequency signals received or reflected by the radiofrequency environment.

The metasurface unit cell array 162 may, in an embodiment, include a metasurface power management unit (PMU) 172. The metasurface PMU 172 may be a power source used to power the devices, circuits, and elements operatively coupled to and/or formed onto the metasurface unit cell array 162. In an embodiment, the metasurface PMU 172 may include a metasurface battery 174 that is used by the metasurface PMU 172 to power, with low power, those devices. Alternatively, and in another embodiment, the metasurface PMU 172 may include a metasurface A/C power adapter 176 that regulates power received from an A/C power source such as that of the information handling system 100. Again, the metasurface unit cell array 162 including the devices, circuits, and elements operatively coupled to and/or formed onto the metasurface unit cell array 162 require low power for operation according to some embodiments herein. In this embodiment, the metasurface PMU 172 may be operatively coupled to the PMU 128 of the information handling system 100 such that the PMU 128 and metasurface PMU 172 operate together to provide power to those devices associated with the metasurface unit cell array 162 as described herein.

In an embodiment, the metasurface unit cell array 162 includes a plurality of metasurface unit cells 188, 190 shown in FIG. 1 to include, at least, a first metasurface unit cell 188 and a second metasurface unit cell 190. It is appreciated, however, that the metasurface unit cell array 162 may include more than the first metasurface unit cell 188 and second metasurface unit cell 190 shown in FIG. 1. In an embodiment, the metasurface unit cell array 162 may include an array of metasurface unit cells 188, 190 arranged in rows and columns that may include nine by nine array of unit cells. It is appreciated, however, that any arrangement and any number of metasurface unit cells 188, 190 may be used to form the metasurface unit cell array 162 described herein. In an embodiment, a plurality of metasurface unit cells 188, 190 may form a subgroup of unit cells with the metasurface unit cell array 162 including a plurality of subgroups of metasurface unit cells 188, 190. In an embodiment, each subgroup of unit cells may include nine metasurface unit cells 188, 190 with each subgroup of unit cells being operatively coupled to a metasurface controller 178 that controls the operation of each of the subgroups of metasurface unit cells 188, 190 and, in an embodiment, each metasurface unit cell individually.

In an embodiment, each metasurface unit cell 188, 190 may be operatively controlled by the metasurface controller 178. In order to control the operation of each of the metasurface unit cells 188, 190 and/or a subgroup of metasurface unit cells 188, 190 within the metasurface unit cell array 162, the metasurface controller 178 may control the operation of a switch circuit 180, a signal matching circuit or power combiner circuit 182, one or more attenuator circuits 184, or one or more tunable delay circuits 186 in various embodiments. For ease of understanding, the operation of the metasurface controller 178, switch circuit 180, power combiner circuit 182, attenuator circuit 184, and tunable delay circuit 186 will be described as controlling a single subgroup of metasurface unit cells 188, 190 within the metasurface unit cell array 162. It is appreciated, however, that the metasurface controller 178, via the operation of the switch circuit 180 and power combiner circuit 182, may control the operation of a single attenuator circuit 184 and tunable delay circuit 186 for a subgroup of metasurface unit cells 188, 190 among a plurality of subgroups of metasurface unit cells 188, 190 within the metasurface unit cell array 162 in various embodiments.

Each of the metasurface unit cells 188, 190 may include a passive concentric circular resonating antennas that resonate with incident EM waves propagated omnidirectionally from one or more of the antennas 192-1, 192-2, 192-3, 192-4 formed on a periphery of metasurface unit cell array 162 or nearby the metasurface unit cell array 162 or even incident EM waves received from the radiofrequency environment. The metasurface unit cells 188, 190 may include a conductive fixed tab within the concentric circular antennas in an embodiment. Further, while concentric circular antennas are discussed in embodiments herein, any shape of concentric antennas for the passive portions of the metasurface unit cell 188, 190 may be used. These passive concentric circular resonating antennas of the metasurface unit cells 188, 190 may receive those incident EM waves and transfer the EM wave resonance through a coupler and to a microwave circuit placed below the passive concentric circular resonating antennas of each metasurface unit cell 188, 190. The microwave circuit of each metasurface unit cell 188, 190 act as the processing units that manipulate the captured EM wave energy from the passive concentric circular resonating antennas and couplers by receiving input signals from the passive concentric circular resonating antennas and couplers with adjusted signals being sent to the power combiner circuit 182 to synthesize a unified waveform for propagation back to the metasurface unit cells 188, 190. In an embodiment, one or more impedance match junctions between each of the microwave circuits may be used to direct those signals from each microwave circuit to a signal matching circuit that optimizes signal flow into other processing elements described herein.

In an embodiment, the signal matching circuit ensures that optimal impedance alignment as energy flows from the microwave circuits. In an embodiment, the signal matching circuit refines impedance alignment thereby enhancing the signal quality from each of the microwave circuits of each of the metasurface unit cells 188, 190 thereby minimizing potential power losses during transmission.

After the impedance of each signal from each of the microwave circuits has been matched, the signal may be compared at the attenuator circuit 184 and tunable delay circuit 186 to a bias reference input operatively coupled to the hardware processor of the information handling system.

In an embodiment, the bias reference input is received as input to the attenuator circuit 184 and tunable delay circuit 186 to control or change the phase-shift level or attenuation level of the captured, incident radiofrequency signal from the signal matching circuit. In an embodiment, the bias reference input is an actuation voltage for adjustment to tunable components such as the attenuator circuit 184 and tunable delay circuit 186 for selection of a plurality of phase-shift levels applied to or attenuation applied to the incoming captured, radiofrequency signal from the signal matching circuit with the phase characteristics and amplitude defined by the bias reference input. The tunable delay circuit 186 may apply a phase shift to the signal so as to align or oppose the phase of the wavefronts of the emitted and reflected signals thereby contributing to constructive or destructive interference patterns created at the metasurface unit cell array 162. In an embodiment, the attenuator circuit 184 also adjusts the amplitude of the incoming signal from the signal matching circuit from the bias reference input. The bias reference input is a voltage level that may switch switchable elements to dictate the attenuation level needed to achieve the desired signal strength reduction within the null region.

In order to create the null region within the EMF, destructive interference may be employed by the metasurface unit cell array 162. In an example embodiment, when the EM waves incident from the antennas 192-1, 192-2, 192-3, 192-4, or the radiofrequency environment in some embodiments, interact with the signals processed by the metasurface unit cell array 162, the phase alignment and shift of the EM waves incident and reflected from the operation of the tunable delay circuit 186 may be tuned such that troughs of one signal align or are otherwise shifted with peaks of another signal, such as the incident signal, thereby cancelling the EM wave energy and creating the null region. This null region, in an embodiment, may be created at a location around the laptop-type information handling system 100 where the user will be interacting with the information handling system 100 such as in front of the keyboard 152 or a digital display device 150. Amplitude control by the attenuator circuit 184 ensures that the signals have equal but opposite magnitudes thereby enhancing the cancellation effect if needed. It is appreciated that constructive interference techniques may also be employed such that, outside the null region created, the phase and amplitude adjustments by the tunable delay circuit 186 and attenuator circuit 184, respectively, strengthening the emitted EM signals and extending the EM radiofrequency signal lobes in other directions for effective transmission or reflection of radiofrequency signals. These EM radiofrequency signal lobes may be beamformed towards a receiving device such as an AP 144 or base station 146 or another wireless information handling system for better transmission.

During operation, the information handling system 100 may operate the metasurface unit cell array 162 in at least two different modes or states. A first state includes an EMF mitigation mode where the metasurface unit cell array 162 operates to create the null region. The second mode is a signal control mode where, when bandwidth requirements increase for radiofrequency signal transmission or reception, this results in the hardware processor 102 of the information handling system 100 reducing the effects of the attenuation circuit and reducing the phase shifting of the EM waves such that transmitted EM waves for the radiofrequency signals are enhanced or increased. This may be done by the hardware processor 102 of the information handling system 100 providing instructions to a metasurface controller 178 of the metasurface unit cell array 162.

During operation, the hardware processor 102 may execute computer-readable program code of an adaptive EMF mitigation system module 164. The adaptive EMF mitigation system module 164 may interface with an RSSI sensor 166, an SINR sensor 168, and a bandwidth monitoring module 170 to determine whether to direct the metasurface unit cell array 162 in the EMF mitigation mode or signal control mode.

For example, the adaptive EMF mitigation system module 164 may interface with the RSSI sensor 166 to gather RSSI data. This RSSI sensor 166 detects the signal environment at and around the information handling system 100 by measuring the strength of the EM signals received at the information handling system 100. This may be expressed in terms of decibels (dBm). In an embodiment, the RSSI sensor 166 may continuously sense the dBm levels of EM signals at the information handling system or may be operated to occasionally monitor these dBm levels. The RSSI sensor 166 supplies real-time data to the hardware processor 102 with dBm levels with the hardware processor 102 to compare current dBm levels to a baseline dBm level to determine if a threshold dBm level has been exceeded that may create an EMF that is to be mitigated via operation of the metasurface unit cell array 162.

The SINR sensor 168 provides detailed feedback about the quality of the wireless signals being received and their susceptibility to interference and noise. In an embodiment, the SINR sensor 168 evaluates the quality of wireless signals emitted or received by the antennas 192-1, 192-2, 192-3, 192-4 of the information handling system 100 or received from external sources. The SINR sensor 168 may help to determine whether the signal-to-noise conditions are sufficient for reliable communication between the information handling system 100 and other receiving/transmitting devices within the environment. As described herein, the data received by the hardware processor 102 from the RSSI sensor 166 and SINR sensor 168 helps to determine whether a null region is created within the EMF at the information handling system 100 or not.

In an embodiment, computer-readable program code instructions of a bandwidth monitoring module 170 may also be executed by the hardware processor 102. The bandwidth monitoring module 170 may assess current and real-time bandwidth requirements of the information handling system 100 to ensure that wireless communication meets the user's needs while minimizing unnecessary EM wave emissions when available. For example, the user may execute computer-readable program code of an online gaming or video streaming software application. In so doing, the bandwidth requirements at the information handling system 100 may increase such that creation of the null region may prevent an increase in bandwidth capacity at the information handling system 100. As such, the hardware processor, detecting an increase in bandwidth requirements via operation of the bandwidth monitoring module 170, may decrease the size of the null region created or eliminate the null region so that higher amounts of data may be transmitted. As described herein, this may be done at the metasurface unit cell array 162 with the hardware processor 102 directing the metasurface controller 178 to control the appropriate elements of the metasurface unit cell array 162 to reduce the null region or eliminate it. However, where the bandwidth requirements do not exceed the bandwidth threshold requirements, the hardware processor 102 may direct the metasurface controller 178 to continue to create the null region as described herein.

During operation of the adaptive EMF mitigation system module 164, the hardware processor 102 may determine current EM environment using the data from the RSSI sensor 166, SINR sensor 168, and bandwidth monitoring module 170 and, based on that data, direct the metasurface controller 178 to place the metasurface unit cell array 162 in either of the EMF mitigation mode or the signal control mode. In order to switch between these two modes, the metasurface controller 178 may operate a switch circuit 180 that switches from a signal control mode that reduces the operations of the power combiner circuit 182, attenuator circuit 184, and tunable delay circuit 186 or the EMF mitigation mode that directs the power combiner circuit 182, attenuator circuit 184, and tunable delay circuit 186 to control the EMF and create a null region within the EMF.

Thus, where the data from the RSSI sensor 166, SINR sensor 168, and bandwidth monitoring module 170 indicates that the EMF should be controlled to create a null region, the metasurface controller 178 may switch from the signal control mode to the EMF mitigation mode and the operation of the power combiner circuit 182, attenuator circuit 184, and tunable delay circuit 186 by the metasurface controller 178 creates the null region. For example, the tunable delay circuit 186 may introduce controlled delays to incoming EM wave signals at the metasurface unit cell array 162 thereby altering the phase of the signals and allowing those signals to be shifted forward or backward in time. This allows for the metasurface controller 178 to create destructive interference signals, constructive interference signals, or both in order to create the null region. In another example embodiment, the attenuator circuit 184 may be used by the metasurface controller 178 to reduce the amplitude of the incoming or outgoing EM wave signals thereby lowering signal strength and minimizing the power of EM waves in regions where nullification or mitigation is required such as where the user is present in front of the information handling system 100.

The power combiner circuit 182 may also be used to combine multiple input signals, after they have been adjusted for amplitude and phase by the attenuator circuit 184 and the tunable delay circuit 186 respectively, into a single unified output signal. This combined signal may be transmitted to the metasurface unit cell array 162 which uses the output signal to manipulate the EMF in a controlled manner. The power combiner circuit 182 may be used to optimize transmissions to the metasurface unit cell array 162 thereby ensuring that the metasurface unit cell array 162 receives a clean and coherent input for resonance and EM wave manipulation as described herein. The output from the power combiner circuit 182 may interact with the metasurface unit cells 188, 190 of the metasurface unit cell array 162 to generate resonance and produce targeted constructive or destructive interference patterns that are used to create the null region in the vicinity of a user or to direct controlled EM lobes for radiofrequency transmissions in other directions.

Thus, the presently-described metasurface unit cell array 162 of embodiments herein is real-time configurable such that the metasurface unit cell array 162 can selectively create null regions within an EMF. The methods and systems described herein using the metasurface unit cell array 162 may dynamically adjust the phase of the metasurface unit cell array 162 thereby creating the null regions to minimize EMF exposure to the user as well as reduce the overall EMF footprint around the information handling system 100. Similarly, metasurface unit cell array 162 may dynamically adjust the phase of the metasurface unit cell array 162 thereby creating directional EM wave transmission lobe regions to enhance radiofrequency signal communications to or from other directions to improve certain aspects of radiofrequency signal wireless operation of the information handling system 100 Unlike systems that use passive shielding materials, the presently described system and method incorporates an adaptive reconfigurable metasurface unit cell array 162 that selectively steers and enhances signal directionality and strength originating from the antennas 192-1, 192-2, 192-3, 192-4 in real-time. The inclusion of the adaptive attenuator circuit 184 provides for the management of signal strength with the system described herein being capable of gradually adjusting the attenuator circuit 184 and power combiner circuit 182 based on real-time bandwidth requirements and real-time wireless signal conditions at the information handling system 100.

When referred to as a “system,” a “device,” a “module,” a “controller,” or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
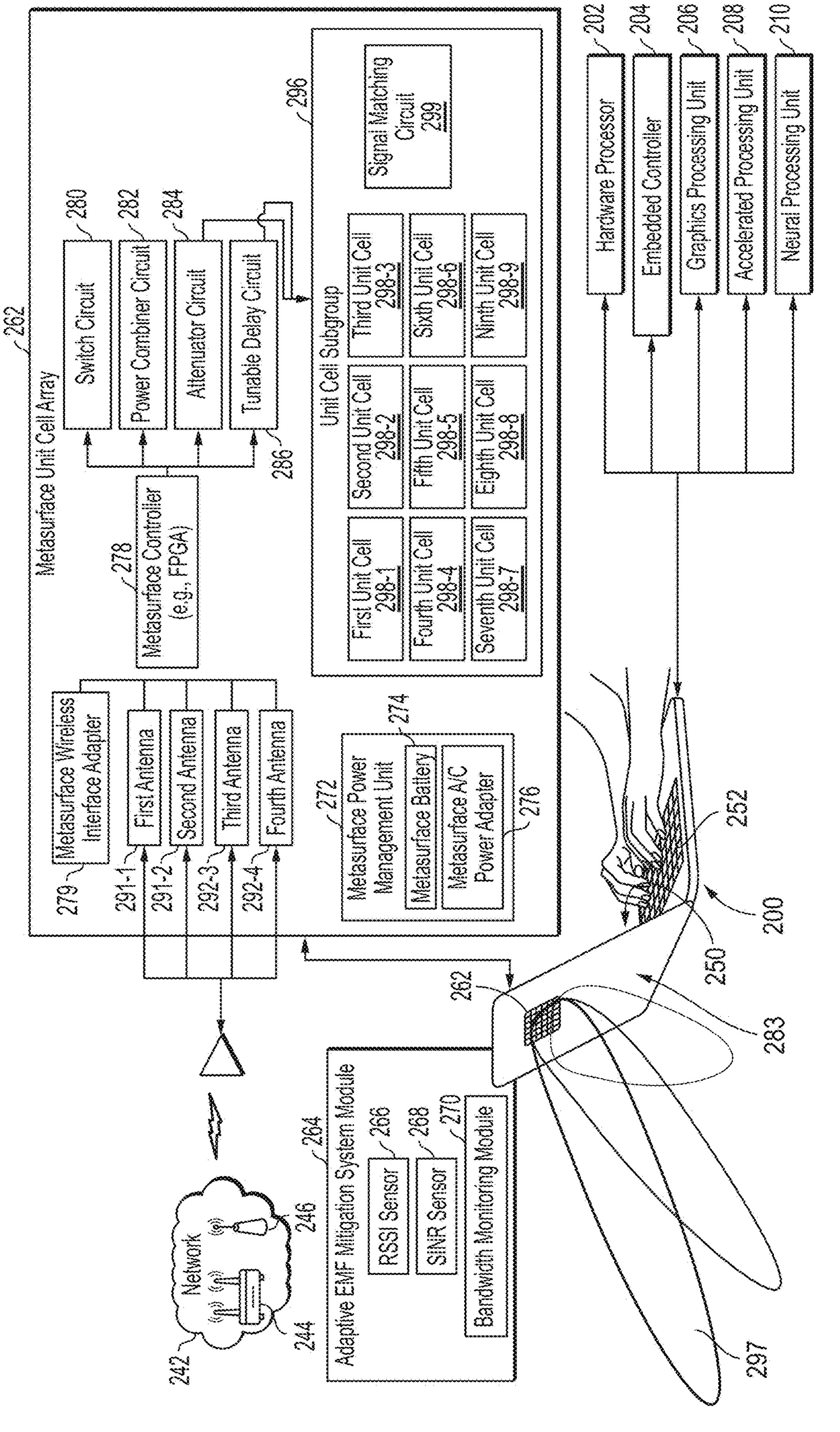
FIG. 2 is a block and graphic diagram illustrating an information handling system and a metasurface unit cell array comprising a plurality of metasurface unit cells operatively coupled to the information handling system according to an embodiment of the present disclosure.

FIG. 2 is a block and graphic diagram illustrating an information handling system 200 and a metasurface unit cell array 262 comprising a plurality of metasurface unit cells 298-1 to 298-9 operatively coupled to the information handling system 200 according to an embodiment of the present disclosure. FIG. 2 shows the information handling system 200 as a laptop-type information handling system 200 that may include a digital display device 250 and a keyboard 252 as an output and input device, respectively. The laptop-type information handling system 200 allows for the operative coupling of the metasurface unit cell array 262 to the information handling system 200 on a surface of the display chassis lid portion or a-cover 283 of the information handling system 200. In an embodiment, the information handling system 200 may be operatively coupled to the metasurface unit cell array 262 and the metasurface controller 278 (e.g., a field programmable gate array) via a hardware connection such as a wired connection passing through the a-cover 283. In this embodiment, the PMU (e.g., 128, FIG. 1) of the information handling system 200 may provide power to the metasurface unit cell array 262 instead of the metasurface unit cell array 262 using a metasurface PMU (e.g., 172, FIG. 1) and a separate power source.

As described herein, the information handling system 200 includes a metasurface unit cell array 262. In an embodiment, the metasurface unit cell array 262 which may be affixed to or installed on a cover of the information handling system 200 such as the A-cover 283 of the laptop-type information handling system 200 shown. The A-cover 283 represents the top portion of the display chassis lid of the information handling system 200. By placing the metasurface unit cell array 262 on the A-cover 283, electromagnetic fields (EMFs) generated by electromagnetic (EM) waves transmitted and received by antennas 292-1, 292-2, 292-3, and 292-4 can be controlled via, at least, the creation of the null region described herein. This placement of the metasurface unit cell array 262 facilitates the creation of a null region within the generated EMFs, effectively reducing EMF exposure at or around the user. In other embodiments, the placement of the metasurface unit cell array 262 on the A-cover 283, electromagnetic fields (EMFs) generated by electromagnetic (EM) waves transmitted and received by antennas 292-1, 292-2, 292-3, and 292-4 can be controlled via, at least, the creation EM wave radiofrequency transmission lobes in other directions from the user or generally directional towards a target wireless device such as an access point 146 or base station 144 in various embodiments herein and depending on radiofrequency environment conditions and bandwidth needs.

The metasurface unit cell array 262 may, in an embodiment, include a metasurface PMU 272. The metasurface PMU 272 may be used to power the devices, circuits, and elements operatively coupled to and/or formed onto the metasurface unit cell array 262. In an embodiment, the metasurface PMU 272 may include a metasurface battery 274 that is used by the metasurface PMU 272 to power those devices. Alternatively, and in another embodiment, the metasurface PMU 272 may include a metasurface A/C power adapter 276 that regulates power received from an A/C power source such as that of the information handling system 200. In this embodiment, the metasurface PMU 272 may be operatively coupled to the PMU 228 of the information handling system 200 such that the PMU 228 and metasurface PMU 272 operate together to provide power to those devices associated with the metasurface unit cell array 262 as described herein.

In an embodiment, the metasurface unit cell array 262 includes a plurality of metasurface unit cells 298-1 through 298-9 shown in FIG. 2 to include, at least a first metasurface unit cell 298-1, a second metasurface unit cell 298-2, a third metasurface unit cell 298-3, a fourth metasurface unit cell 298-4, a fifth metasurface unit cell 298-5, a sixth metasurface unit cell 298-6, a seventh metasurface unit cell 298-7, an eight metasurface unit cell 298-8, and a ninth metasurface unit cell 298-9. It is appreciated, however, that the metasurface unit cell array 262 may include more than the metasurface unit cells 298-1 through 298-9 shown in FIG. 2. In an embodiment, the metasurface unit cell array 262 may include an array of metasurface unit cells 298-1 through 298-9 arranged in rows and columns that may include the nine-by-nine array of metasurface unit cells 298-1 through 298-9. It is appreciated, however, that any arrangement and any number of metasurface unit cells 298-1 through 298-9 may be used to form the metasurface unit cell array 262 described herein. In an embodiment, a plurality of metasurface unit cells 298-1 through 298-9 may form a unit cell subgroup 296 with the metasurface unit cell array 262 including a plurality of subgroups of metasurface unit cells 298-1 through 298-9. In an embodiment, each unit cell subgroup 296 may include metasurface unit cells 298-1 through 298-9 with each unit cell subgroup 296 being operatively coupled to the metasurface controller 278 that controls the operation of each of the unit cell subgroup 296 and the respective metasurface unit cells 298-1 through 298-9 and, therefore, each metasurface unit cell 298-1 through 298-9 individually.

In an embodiment, each metasurface unit cell 298-1 through 298-9 may be operatively controlled by the metasurface controller 278. In order to control the operation of each of the metasurface unit cells 298-1 through 298-9 and/or a unit cell subgroups 296 within the metasurface unit cell array 262, the metasurface controller 278 may control the operation of a switch circuit 280, a power combiner circuit 282, one or more attenuator circuits 284 (e.g., an attenuator circuit 284 for each unit cell subgroup 296), or one or more tunable delay circuits 286 (e.g., a tunable delay circuit 286 for each unit cell subgroup 296). For ease of understanding, the operation of the metasurface controller 278, switch circuit 280, power combiner circuit 282, attenuator circuit 284, and tunable delay circuit 286 will be described as controlling a single unit cell subgroup 296 of metasurface unit cells 298-1 through 298-9 within the metasurface unit cell array 262. It is appreciated, however, that the metasurface controller 278, via the operation of the switch circuit 280 and power combiner circuit 282, may control the operation of a single attenuator circuit 284 and tunable delay circuit 286 for a unit cell subgroup 296 among a plurality of unit cell subgroups 296 within the metasurface unit cell array 262 in an embodiment.

Each of the metasurface unit cells 298-1 through 298-9 may include passive concentric circular resonating antennas that resonate with incident EM waves propagated omnidirectionally from one or more of the antennas 292-1, 292-2, 292-3, 292-4 formed on a periphery of metasurface unit cell array 262 or nearby the metasurface unit cell array 262. The metasurface unit cells 298-1 to 298-9 may include a conductive fixed tab within the concentric circular antennas in an embodiment. Further, while concentric circular antennas are discussed in embodiments herein, any shape of concentric antennas for the passive portions of the metasurface unit cell 298-1 to 298-9 may be used. These passive concentric circular resonating antennas may also resonate incident EM waves received from the radiofrequency environment in other embodiments. The passive concentric circular resonating antennas of the metasurface unit cells 298-1 through 298-9 may receive those incident EM waves and transfer the EM wave resonance through a coupler and to a microwave circuit placed below the passive concentric circular resonating antennas of each metasurface unit cell 298-1 through 298-9. The microwave circuit of each metasurface unit cell 298-1 through 298-9 may act as the processing units that manipulate the captured EM wave energy from the passive concentric circular resonating antennas and couplers by receiving input signals from the passive concentric circular resonating antennas and the couplers. Then adjusted signals are sent to the power combiner circuit 282 to synthesize a unified waveform. In an embodiment, one or more impedance match junctions between each of the microwave circuits may be used to direct those signals from each microwave circuits to a signal matching circuit that optimize signal flow into other processing elements described herein.

In an embodiment, a unit cell subgroup 296 may include a signal matching circuit 299. The signal matching circuit 299 ensures an optimal impedance alignment as energy flows from the microwave circuits. In an embodiment, the signal matching circuit 299 refines impedance alignment thereby enhancing the signal quality from each of the microwave circuits of each of the metasurface unit cells 298-1 through 298-9 thereby minimizing potential power losses during transmission for adjustments to phase shift a resonating circuit for constructive or destructive interference signals according to embodiments herein.

After the impedance of each signal from each of the microwave circuits has been matched, the signal may be compared at the attenuator circuit 284 and tunable delay circuit 286 to a bias reference input operatively coupled to the hardware processor of the information handling system. In an embodiment, the bias reference input is received as input to the attenuator circuit 284 and tunable delay circuit 286 tunable delay circuit 186 to control or change the phase-shift level or attenuation level of the captured, incident radiofrequency signal from the signal matching circuit. In an embodiment, the bias reference input is an actuation voltage for adjustment to tunable components such as the attenuator circuit 284 and tunable delay circuit 286 for selection of a plurality of phase-shift levels applied to or attenuation applied to the incoming captured, radiofrequency signal from the signal matching circuit with the phase characteristics and amplitude defined by the bias reference input. The tunable delay circuit 286 may apply a phase shift to the received radiofrequency signal so as to align or oppose at any phase shift up to a 180 degree shift the wavefronts of the emitted and reflected signals sent back to one or more metasurface unit cells 289-1 to 289-1, thereby contributing to constructive or destructive interference patterns created at the metasurface unit cell array 262. In an embodiment, the attenuator circuit 284 also adjusts the amplitude of the incoming received radiofrequency signal from the signal matching circuit to the bias reference input setting the attenuator circuit 284. The bias reference input is an actuation voltage for tunable components, such as attenuator circuit 284 and stepped tunable delay circuit 286 to dictate the attenuation level and phase-shift needed to achieve the desired signal strength for amplitude levels of the reflected signals to achieve sufficient destructive interference within the null region or allow more radiofrequency signal through for the information handling system.

In order to create the null region within the EMF of radiofrequency signals at the information handling system 200, destructive interference may be employed by the metasurface unit cell array 262. In an example embodiment, when the EM waves from the antennas 292-1, 292-2, 292-3, 292-4 interact with the reflected, phase-shifted signals processed by the metasurface unit cell array 262 such that the phase alignment from the operation of the tunable delay circuit 286 may be tuned such that troughs of the reflected radiofrequency signal from the metasurface align or correspond to any degree with peaks of the transmitted radiofrequency signal thereby cancelling or reducing the EM wave energy and creating the null region. This null region, in an embodiment, may be created at a location around the laptop-type information handling system 200 where the user will be interacting with the information handling system 200 such as in front of the keyboard or the digital display device. Amplitude control by the attenuator circuit 284 ensures that the signals have equal by opposite magnitudes thereby enhancing the cancellation effect. It is appreciated that constructive interference techniques may also be employed such that, outside the null region created, the phase and amplitude adjustments by the tunable delay circuit 286 and attenuator circuit 284, respectively, strengthening the emitted EM signals and extending the EM radiofrequency signal lobes 297 for the transmission of the radiofrequency data signals. These EM radiofrequency signal lobes 297 may be beamformed towards a receiving device such as an AP 244, a base station 246, or another wireless information handling system for better transmission or reception of radiofrequency signals.

During operation, the information handling system 200 may operate the metasurface unit cell array 262 in at least two different modes or states. A first state includes an EMF mitigation mode where the metasurface unit cell array 262 operates to create the null region. The second mode is a signal control mode where, when bandwidth requirements increase, resulting in the hardware processor 202 of the information handling system 200 reducing the effects of the attenuation circuit and reducing the phase shifting of the EM waves in creating the null region for better EM radiofrequency signal transmission or reception. This may be done by the hardware processor 202 of the information handling system 200 providing instructions to a metasurface controller 278 of the metasurface unit cell array 262.

During operation, the hardware processor 202 may execute computer-readable program code of an adaptive EMF mitigation system module 264. The adaptive EMF mitigation system module 264 may interface with an RSSI sensor 266, an SINR sensor 268, and a bandwidth monitoring module 270 to determine whether to direct the metasurface unit cell array 262 in the EMF mitigation mode or signal control mode. For example, the adaptive EMF mitigation system module 264 may interface with the RSSI sensor 266 to gather RSSI data. This RSSI sensor 266 detects the signal environment at and around the information handling system 200 by measuring the strength of the EM signals received at the information handling system 200. This may be expressed in terms of decibels (dBm). In an embodiment, the RSSI sensor 266 may continuously sense the dBm levels of EM signals at the information handling system or may be operated to occasionally monitor these dBm levels. The RSSI sensor 266 supplies real-time data to the hardware processor 202 with dBm levels with the hardware processor 202 to compare current dBm levels to a baseline dBm level to determine if a threshold dBm level has been exceeded that may create an EMF that is to be mitigated via operation of the metasurface unit cell array 262.

The SINR sensor 268 provides detailed feedback about the quality of the wireless signals being received and their susceptibility to interference and noise. In an embodiment, the SINR sensor 268 evaluates the quality of wireless signals emitted by the antennas 292-1, 292-2, 292-3, 292-4 of the information handling system 200 or received from external sources. The SINR sensor 268 may help to determine whether the signal-to-noise conditions are sufficient for reliable communication between the information handling system 200 and other receiving/transmitting devices within the environment. As described herein, the data received by the hardware processor 202 from the RSSI sensor 266 and SINR sensor 268 helps to determine whether a null region is created within the EMF at the information handling system 200 or not.

In an embodiment, computer-readable program code instructions of a bandwidth monitoring module 270 may also be executed by the hardware processor 202. The bandwidth monitoring module 270 may assess current and real-time bandwidth requirements of the information handling system 200 to ensure that wireless communication meets the user's needs while minimizing unnecessary EM wave emissions. For example, the user may execute computer-readable program code of an online gaming or video streaming software application. In so doing, the bandwidth requirements at the information handling system 200 may increase such that creation of the null region may prevent an increase in bandwidth capacity at the information handling system 200. As such, the hardware processor, detecting an increase in bandwidth requirements via operation of the bandwidth monitoring module 270, may decrease the size of the null region created or eliminate the null region so that higher amounts of data may be transmitted or received at the information handling system 200. As described herein, this may be done at the metasurface unit cell array 262 with the hardware processor 202 directing the metasurface controller 278 to control the appropriate elements of the metasurface unit cell array 262 to reduce the null region or eliminate it and enhance directionality and levels for any EM radiofrequency signal lobes, including those shown at 297 and others within a null region. However, where the bandwidth requirements do not exceed the bandwidth threshold requirements, the hardware processor 202 may direct the metasurface controller 278 to continue to create the null region as described herein to reduce user EMF exposure.

During operation of the adaptive EMF mitigation system module 264, the hardware processor 202 may determine current EM environment using the data from the RSSI sensor 266, SINR sensor 268, and bandwidth monitoring module 270 and, based on that data, direct the metasurface controller 278 to place the metasurface unit cell array 262 in either of the EMF mitigation mode or the signal control mode. In order to switch between these two modes, the metasurface controller 278 may operate a switch circuit 280 that switches from a signal control mode that reduces the operations of the power combiner circuit 282, attenuator circuit 284, and tunable delay circuit 286 or the EMF mitigation mode that directs the power combiner circuit 282, attenuator circuit 284, and tunable delay circuit 286 to control the EMF and create a null region within the EMF.

Thus, where the data from the RSSI sensor 266, SINR sensor 268, and bandwidth monitoring module 270 indicates that the EMF should be controlled to create a null region, the metasurface controller 278 may switch from the signal control mode to the EMF mitigation mode and the operation of the power combiner circuit 282, attenuator circuit 284, and tunable delay circuit 286 by the metasurface controller 278 creates the null region. For example, the tunable delay circuit 286 may introduce controlled delays to incoming EM wave signals at the metasurface unit cell array 262 thereby altering the phase of the signals and allowing those signals to be shifted forward or backward in time. This allows for the metasurface controller 278 to create destructive interference signals, constructive interference signals, or both in order to create the null region as well as determine one or more the EM radiofrequency signal lobes 297 for radiofrequency transmission. In another example embodiment, the attenuator circuit 284 may be used by the metasurface controller 278 to reduce the amplitude of the incoming or outgoing EM wave signals thereby lowering signal strength and minimizing the power of EM waves in regions where nullification or mitigation is used where the user is present in front of the information handling system 200.

The power combiner circuit 282 may also be used to combine multiple input signals, after they have been adjusted for amplitude and phase by the attenuator circuit 284 and the tunable delay circuit 286 respectively, into a single unified output signal. This combined signal may be transmitted to the metasurface unit cell array 262 which uses the output signal to manipulate the EMF in a controlled manner. The power combiner circuit 282 may be used to optimize transmissions to the metasurface unit cell array 262 thereby ensuring that the metasurface unit cell array 262 receives a clean and coherent input for resonance and EM wave manipulation of a clean constructive or destructive resonant signal as described herein. The output from the power combiner circuit 282 may interact with the metasurface unit cells 298-1 through 298-9 of the metasurface unit cell array 262 to generate resonance and produce targeted constructive or destructive interference patterns that are used to create the null region or to create one or more the EM radiofrequency signal lobes 297 depending on modes and locations of a user and any target wireless devices such as APs 244 or base stations 246.

Figure 3:
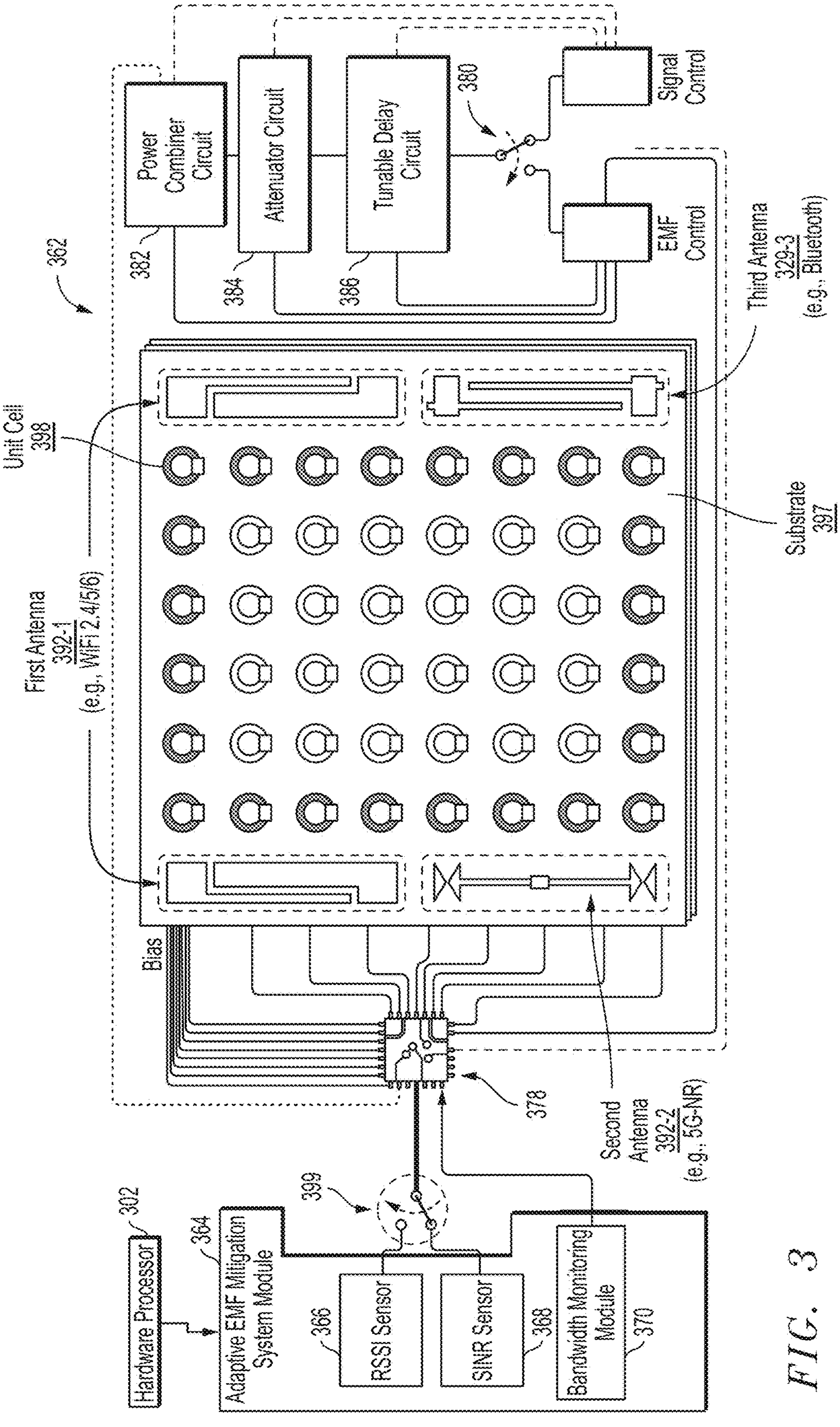
FIG. 3 is block and graphic diagram of a metasurface unit cell array operatively coupled to a metasurface controller, power combiner, attenuator circuit, and tunable delay circuit according to an embodiment of the present disclosure.

FIG. 3 is block and graphic diagram of a metasurface unit cell array operatively coupled to a metasurface controller, power combiner, attenuator circuit, and tunable delay circuit according to an embodiment of the present disclosure. The metasurface controller 378 may be operatively coupled to an information handling system (not shown) that includes a hardware processor 302 that may execute computer-readable program code of a bandwidth monitoring module 370 as described herein.

FIG. 3 shows the metasurface unit cell array 362 that includes an array of six-by-eight metasurface unit cells 398. In an embodiment, the metasurface unit cells 398 may be grouped into unit cell subgroups (e.g., 296, FIG. 2). It is appreciated, however, that this layout of metasurface unit cells 398 is merely an example and the present specification contemplates that the metasurface unit cell array 362 may include less or more than those metasurface unit cells 398 shown in FIG. 3. In an embodiment, the unit cell subgroups described herein may also include any number of metasurface unit cells 398 thereby allowing for the formation of any number of unit cell subgroups. In an embodiment and in order to reduce the number of circuits of the metasurface unit cell array 362, each unit cell subgroup may have an attenuator circuit 384, a tunable delay circuit 386, and signal matching circuit (not shown) that operate to control the EMF around the information handling system and, in an embodiment, emitted by the various antennas 392-1, 392-2, 392-3. The metasurface unit cells 398 may be formed on to a substrate 397 which may include, for example, High Resistivity Silicon (HRSi), Aluminum Oxide ($Al_2O_3$), a printed circuit board (PCB), sapphire, glass, or other dielectric materials.

FIG. 3 shows the metasurface controller 378 operatively coupled to a power combiner 382, an attenuator circuit 384, and a tunable delay circuit 386. Again, a single power combiner 382, attenuator circuit 384, and tunable delay circuit 386 may be used to control each of the individual metasurface unit cells 398 or a plurality of power combiners 382, attenuator circuits 384, and tunable delay circuits 386 may be associated with the operation of a subgroup of unit cells. For illustrative purposes only, FIG. 3 shows a single power combiner 382, attenuator circuit 384, and tunable delay circuit 386.

During operation, the hardware processor 302 may execute computer-readable program code of an adaptive EMF mitigation system module 364. The adaptive EMF mitigation system module 364 may interface with an RSSI sensor 366, an SINR sensor 368, and a bandwidth monitoring module 370 to determine whether to direct the metasurface unit cell array 362 to operate in the EMF mitigation mode or signal control mode in generating constructive or destructive reflected radiofrequency signals across the metasurface unit cell array 362. In an embodiment, the adaptive EMF mitigation system module 364 may interface with the RSSI sensor 366 to gather RSSI data. This RSSI sensor 366 detects the signal environment at and around the information handling system by measuring the strength of the EM signals received at or transmitted from the information handling system. In an embodiment, the RSSI sensor 366 may continuously sense the dBm levels of EM signals at the information handling system or may be operated to occasionally monitor these dBm levels. The RSSI sensor 366 supplies real-time data to the hardware processor 302 with dBm levels with the hardware processor 302 to compare current dBm levels to a baseline dBm level to determine if a threshold dBm level has been exceeded that may create an EMF at the information handling system that is to be mitigated via operation of the metasurface unit cell array 362.

The SINR sensor 368 provides detailed feedback about the quality of the wireless signals being received and their susceptibility to interference and noise. In an embodiment, the SINR sensor 368 evaluates the quality of wireless signals emitted by the antennas 392-1, 392-2, 392-3 of the information handling system or received from external sources. The SINR sensor 368 may help to determine whether the signal-to-noise conditions are sufficient for reliable communication between the information handling system and other receiving/transmitting devices within the environment. As described herein, the data received by the hardware processor 302 from the RSSI sensor 366 and SINR sensor 368 helps to determine whether a null region is created within the EMF at the information handling system or not. For example, the hardware processor 302 may, based at least partially on the RSSI data and SINR data from the RSSI sensor 366 and SINR sensor 368, respectively, the hardware processor 302 may switch a performance indicator switch 399 so that the metasurface controller 378 may receive the data from the RSSI sensor 366 and SINR sensor 368 based on a mode the metasurface unit cell array 362 is to be placed in. These modes, as described herein, include an EMF mitigation mode and a signal control mode.

In an embodiment, computer-readable program code instructions of a bandwidth monitoring module 370 may also be executed by the hardware processor 302. The bandwidth monitoring module 370 may assess current and real-time bandwidth requirements of the information handling system to ensure that wireless communication meets the user's needs while minimizing unnecessary EM wave emissions. For example, the user may execute computer-readable program code of an online gaming or video streaming software application. In so doing, the bandwidth requirements at the information handling system may increase such that creation of the null region may prevent an increase in bandwidth capacity at the information handling system. As such, the hardware processor 302, detecting an increase in bandwidth requirements via operation of the bandwidth monitoring module 370, may decrease the size of the null region created or eliminate the null region so that higher amounts of data may be transmitted. Further, the hardware processor 302, detecting an increase in bandwidth requirements via operation of the bandwidth monitoring module 370, may increase generation of an EM radiofrequency signal lobe and adjust directionality to improve wireless data transmission bandwidth in embodiments herein. As described herein, this may be done at the metasurface unit cell array 362 with the hardware processor 302 directing the metasurface controller 378 to control the appropriate elements of the metasurface unit cell array 362 to reduce the null region or eliminate it or to increase or direct EM radiofrequency signal lobes in various embodiments. However, where the bandwidth requirements do not exceed the bandwidth threshold requirements, the hardware processor 302 may direct the metasurface controller 378 to continue to create the null region as described herein.

Where the data from the RSSI sensor 366, SINR sensor 368, and bandwidth monitoring module 370 indicate that the bandwidth requirements are low, the threshold dBm level has been exceeded, and the signal-to-noise conditions are sufficient for reliable communication between the information handling system and other receiving/transmitting devices within the environment, the metasurface controller 378 may cause a switch circuit 380 to switch from the signal control mode that optimizes EM wave transception to a EMF mitigation mode that causes the EMFs created by operation of the antennas 392-1, 392-2, 392-3 to be mitigated and a null region formed therein where the user is present.

As described herein, the metasurface unit cell array 362 includes a plurality of antennas 392-1, 392-2, 392-3 formed along a periphery of the metasurface unit cell array 362. A first antenna 392-1, for example, may include a WiFi 2.4/5/6 GHz antenna or a pair of such antenna. A second antenna 392-2 may include a 5G-NR antenna. Additionally, a third antenna 392-3 may include a Bluetooth® antenna. In an embodiment, the passive concentric circular resonating antennas (not shown) of each metasurface unit cell 398 may be formed to resonate at one or all of these frequencies such that EM wave energy may be passed through a passive couple (not shown) and captured by a microwave circuit (not shown). The microwave circuit of each metasurface unit cell 398 may act as the processing units that manipulate the captured EM wave energy from the passive concentric circular resonating antennas and couplers by receiving signals input from the passive concentric circular resonating antennas and couplers and also resonating adjusted signals being sent to the power combiner circuit 382 to synthesize a unified waveform for resonance at one or more metasurface unit cells 398. In an embodiment, one or more impedance match junctions (not shown) between each of the microwave circuits may be used to direct those signals from each microwave circuits to a signal matching circuit that optimize signal flow into other processing elements described herein.

After the impedance of each signal from each of the microwave circuits has been matched, the signal may be compared at the attenuator circuit 384 and tunable delay circuit 386 to a bias reference input operatively coupled to the hardware processor of the information handling system via the metasurface controller 378. In an embodiment, the bias reference input is received as input to the attenuator circuit 384 and tunable delay circuit 386 to control or change the phase-shift level or attenuation level of the captured, incident radiofrequency signal from the signal matching circuit of the received incident EM radiofrequency signal. In an embodiment, the bias reference input is an actuation voltage for adjustment to tunable components such as the attenuator circuit 384 and tunable delay circuit 386 for selection of a plurality of phase-shift levels applied to or attenuation applied to the incoming captured, radiofrequency signal from the signal matching circuit with the phase characteristics and amplitude defined by the bias reference input. The tunable delay circuit 386 may apply a selected phase shift, from zero degrees phase shift up to 180 degrees of phase shift for example, to the captured incident, radiofrequency signal so as to align or oppose the phase of the wavefronts of the emitted and reflected signals thereby contributing to constructive or destructive interference patterns created at any metasurface unit cell 398 or subset of metasurface unit cells 398 in the metasurface unit cell array 362. In an embodiment, the attenuator circuit 384 also adjusts the amplitude of the incoming captured, incident radiofrequency signal from the signal matching circuit based on the bias reference input controlling the amplitude adjustment. The bias reference input is an actuation voltage for tunable components, such as the attenuator circuit 384 and the stepped tunable delay circuit, to dictate the attenuation level and phase-shift needed to achieve the desired signal strength to induce destructive interference within the null region or phase out the destructive interference to allow more signal in when higher bandwidth is needed.

In order to create the null region within the EMF, destructive interference may be employed by the metasurface unit cell array 362 with resonance of a reflected EM radiofrequency signal phase shifted relative to the detected incident radiofrequency signals. In an example embodiment, when the EM waves from the antennas 392-1, 392-2, 392-3 interact with the reflected signals processed and reflected by the metasurface unit cell array 362, the phase alignment from the operation of the tunable delay circuit 386 may be tuned such that troughs of the reflected signal from the metasurface unit cell array 362 align with peaks of the incident radiofrequency signal thereby cancelling the EM wave energy and creating the null region. Alternatively, alignment of the peaks for reflected radiofrequency signals at other metasurface unit cells 398 may yield constructive interference with directionality for one or more EM radiofrequency signal lobes for transmission or reception. The generated null region, in an embodiment, may be created at a location around the laptop-type information handling system where the user will be interacting with the information handling system such as in front of the keyboard. Amplitude control by the attenuator circuit 384 ensures that the signals have equal by opposite magnitudes thereby enhancing the cancellation effect, or alternatively the constructive increase of a transmitted or received radiofrequency signal. It is appreciated that constructive interference techniques may also be employed such that, outside the null region created, the phase and amplitude adjustments by the tunable delay circuit 386 and attenuator circuit 384, respectively, strengthening the emitted EM signals and extending the EM radiofrequency signal lobes outside of any generated null region in some embodiments. These EM radiofrequency signal lobes may be beamformed towards a receiving device such as an AP, base station, or another wireless device for better transmission. Thus, where higher bandwidth requirements are needed pursuant to the data received from the bandwidth monitoring module 370, the metasurface controller 378 may cause the switch circuit 380 to switch from the EMF mitigation mode to the signal control mode as described herein.

Figure 4B:
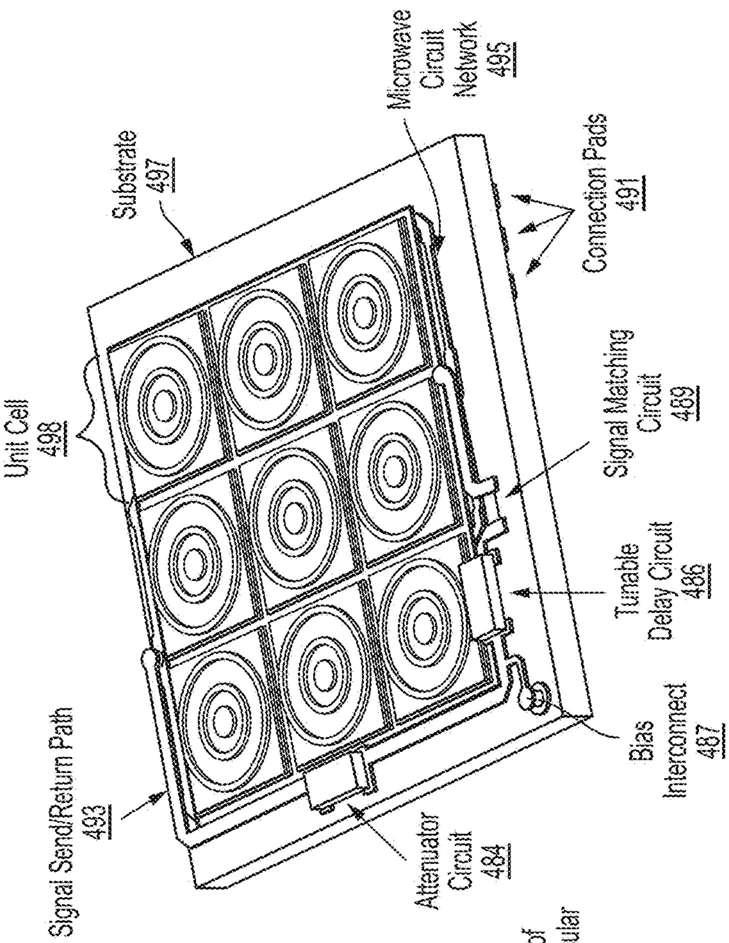
FIG. 4B is a perspective view graphic diagram showing a metasurface unit cell array according to an embodiment of the present disclosure.
Figure 4A:
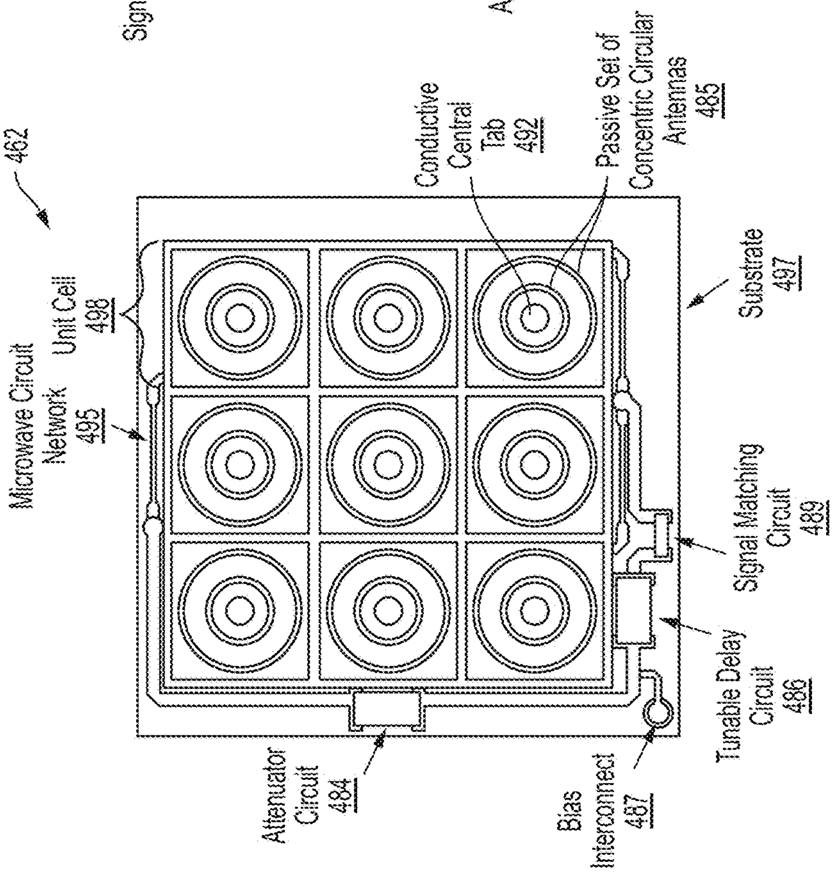
FIG. 4A is a top view graphic diagram showing a metasurface unit cell array according to an embodiment of the present disclosure.

FIG. 4A is a top view graphic diagram showing a metasurface unit cell array according to an embodiment of the present disclosure. Similarly, FIG. 4B is a perspective view graphic diagram showing a metasurface unit cell array according to an embodiment of the present disclosure. Again, the metasurface unit cell array 462 shown in FIGS. 4A and 4B may be an entire metasurface unit cell array 462 or may form a subgrouping of unit cells 498 that may cooperate with similar subgroups of unit cells 498 to form a larger metasurface unit cell array 462.

FIGS. 4A and 4B show a unit cell structure for a plurality of unit cells 498. The unit cells 498 include a passive set of concentric circular antennas 485 that capture incident EM waves and resonate or reflect phase-shifted radiofrequency signals at a plurality of frequencies. The metasurface unit cells 498 may include a conductive fixed tab 492 within the concentric circular antennas 485 in an embodiment. Further, while concentric circular antennas 485 are discussed in embodiments herein, any shape of concentric antennas for the passive portions of the metasurface unit cell 498 may be used. The passive sets of concentric circular antennas 485 of the unit cells 498 may receive those incident EM waves from antennas at the information handling system or from the radiofrequency environment and transfer the EM wave resonance through a coupler (not shown) and to a microwave circuit (not shown) of a microwave circuit network 495 with each of the plurality of microwave circuits placed below each of the passive set of concentric circular antennas 485 of each unit cell 498. The microwave circuit of each unit cell 498 act as the processing units to capture and provide the incident radiofrequency signal for manipulation of the EM wave energy captured from the passive set of concentric circular antennas 485 and couplers. By receiving capture radiofrequency signals incident on the passive set of concentric circular antennas 485 and couplers, these received radiofrequency signals are sent to the power combiner circuit (not shown) to synthesize a unified waveform for feed to tunable delay circuit 486 and the attenuator circuit 484 via a signal impedance matching circuit 489.

In an embodiment, one or more impedance match junctions formed between each of the microwave circuits may be used to direct those signals from each microwave circuits to a signal matching circuit 489, via a signal send/return path 493, that optimize signal flow into other processing elements described herein. In an embodiment, the signal matching circuit 489 ensures that optimal impedance alignment as energy flows from the microwave circuits to avoid power loss of the captured radiofrequency signal from the EM waves incident on the metasurface unit cells 498. In an embodiment, the signal matching circuit 489 refines impedance alignment thereby enhancing the signal quality from each of the microwave circuits of each of the metasurface unit cells 498 thereby minimizing potential power losses during capture and transmission for manipulation to generate a phase-shifted, reflected resonant signal.

After the impedance of each signal from each of the microwave circuits has been matched using the signal matching circuit 489, the captured incident radiofrequency signal may be sent to the attenuator circuit 484 and tunable delay circuit 486 and a bias reference input voltage provided at a bias interconnect 487 and operatively coupled to the hardware processor and metasurface controller of the information handling system. In an embodiment, the bias reference input from the bias interconnect 487 is received as input to the attenuator circuit 484 and tunable delay circuit 486 to adjust amplitude attenuation level and phase-shift level applied to the captured radiofrequency signal fed from the signal matching circuit 489. In an embodiment, the bias reference input is an actuation voltage for adjustment to tunable components such as the attenuator circuit 484 and tunable delay circuit 486 for selection of a plurality of phase-shift levels applied to or attenuation applied to the incoming captured, radiofrequency signal from the signal matching circuit with the phase characteristics and amplitude defined by the bias reference input level selection at those tunable components. The tunable delay circuit 486 may apply a phase shift to the captured, incident radiofrequency signal at any selectable phase shift step, such as anywhere from zero degrees to 180 degrees phase shift, so as to align or oppose the phase of the wavefronts of the reflected signal from the metasurface unit cell array 462 with the captured, incident radiofrequency signal thereby contributing to constructive or destructive interference patterns created at the metasurface unit cell array 462. In an embodiment, the attenuator circuit 484 also adjusts the amplitude of the incoming captured, incident radiofrequency signal from the signal matching circuit 489 via selection of a voltage divider circuit actuated by the bias reference provided at the bias interconnect 487. The bias reference input is an actuation voltage to actuate tunable components, such as the attenuator circuit 484 and the tunable delay circuit 486 to dictate the attenuation level and phase shift level needed to achieve the desired signal strength within the null region or to step back destructive interference when addition radiofrequency signal bandwidth is needed.

In order to create the null region within the EMF created via the operation of the plurality of antennas (not shown) or from the radiofrequency environment, destructive interference reflective radiofrequency signal may be employed by any metasurface unit cell 498, subset of metasurface unit cells 498 or the metasurface unit cell array 462 in embodiments herein. In an example embodiment, when the EM waves from the antennas interact with the signals processed for phase shifting or alignment and reflected by the metasurface unit cell array 462, the phase alignment from the operation of the tunable delay circuit 486 may be tuned such that troughs of one signal align with peaks of another at a 180 degree phase shift or any phase shift thereby cancelling or reducing the EM wave energy and creating the null region at various level of reduce EMF. This null region, in an embodiment, may be created at a location around the laptop-type information handling system where the user will be interacting with the information handling system such as in front of the keyboard. Amplitude control by the attenuator circuit 484 may further ensure that the signals have equal but opposite magnitudes thereby enhancing the cancellation effect. It is appreciated that constructive interference techniques may also be employed such that, for example outside the created null region, the phase and amplitude adjustments by the tunable delay circuit 486 and attenuator circuit 484, respectively, align the reflected radiofrequency signal from the metasurface unit cell array 462 strengthening the emitted EM signals and extending the EM radiofrequency signal lobes. These EM radiofrequency signal lobes may be beamformed towards a receiving device such as an AP or base station for better transmission or reception by some portion of metasurface unit cells 298 of the metasurface unit cell array 462.

As described herein, during operation, the information handling system may operate the metasurface unit cell array 462 in at least two different modes or states. A first state includes an EMF mitigation mode where the metasurface unit cell array 462 operates to create the null region. The second mode is a signal control mode where, when bandwidth requirements at the information handling increase, the hardware processor of the information handling system reduces the effects of the attenuation circuit 484 and reducing the phase shifting of the EM waves by the tunable delay circuit 489. This reduction in attenuation and phase shifting may be done in a stepwise manner such that the EMF may still be mitigated while bandwidth is increased. Thus, it is appreciated that as the bandwidth requirements increase, the attenuation and phase shifting may be reduced stepwise until a sufficient bandwidth is obtained. This may be coordinated between the hardware processor of the information handling system and metasurface controller with the hardware processor providing instructions to a metasurface controller of the metasurface unit cell array 462.

In an embodiment, the metasurface unit cell array 462 may include one or more connection pads 491 that allow the metasurface controller and/or hardware controller to be operatively coupled to the power combiner, attenuator circuit 484, tunable delay circuit 486, and other elements on the metasurface unit cell array 462. It is appreciated that various connection pads 491 may be formed below a substrate 497 layer of the metasurface unit cell array 462 with leads passing through the substrate 497 and to the various elements such as the tunable delay circuit 486 and attenuator circuit 484.

Figure 5:
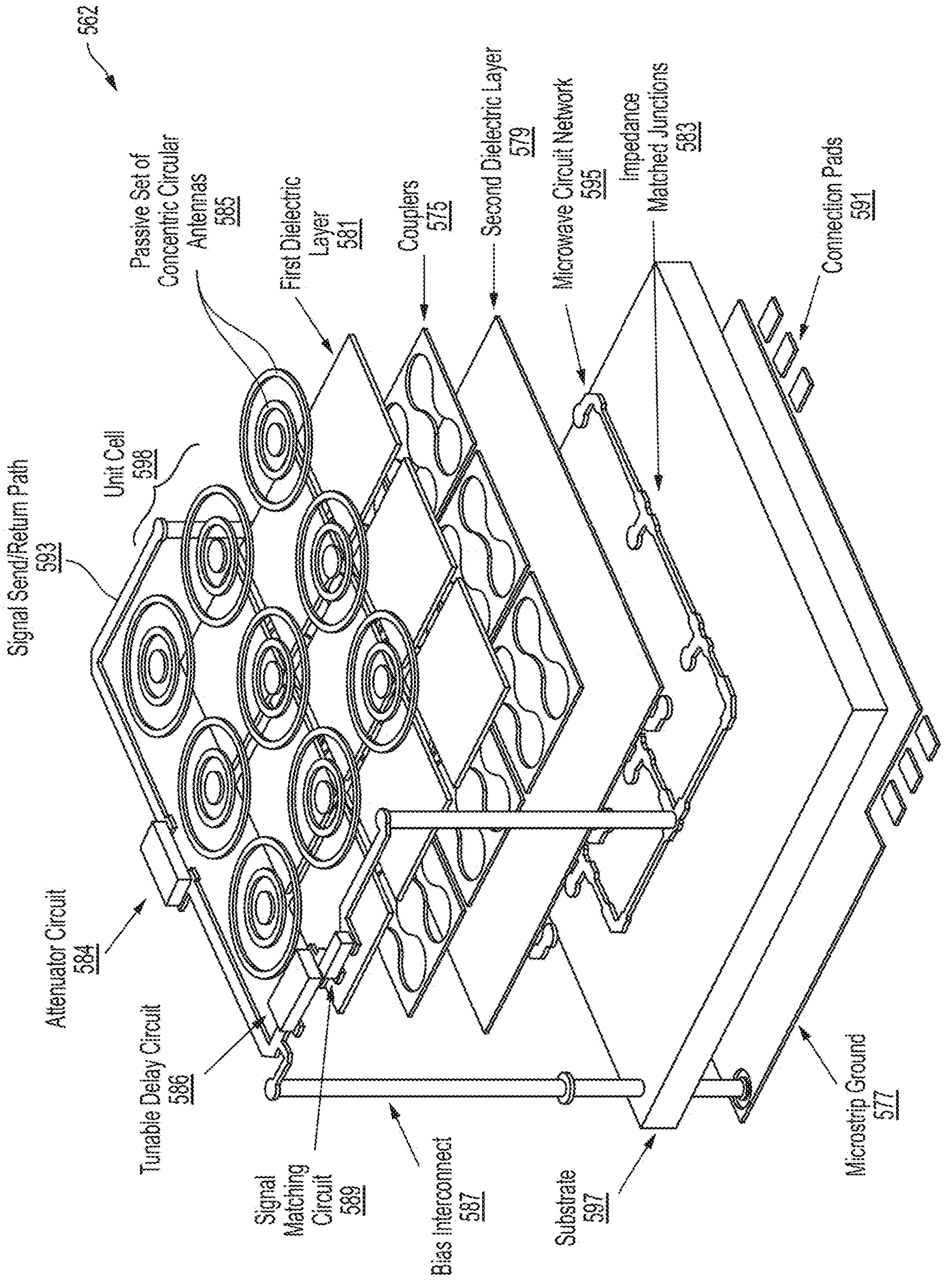
FIG. 5 is an exploded perspective view graphic diagram showing a metasurface unit cell array according to an embodiment of the present disclosure.

FIG. 5 is an exploded view graphic diagram showing a metasurface unit cell array according to an embodiment of the present disclosure. This exploded view may show additional elements within each of the unit cells 598 while also showing similar elements to that described in connection with FIGS. 4A and 4B, for example.

FIG. 5 shows the passive set of concentric circular antennas 585 that capture incident EM waves of radiofrequency signals and reflect and resonate at a plurality of frequencies that may be phase-shifted or aligned with the captured radiofrequency signals. The metasurface unit cells 598 may include a conductive fixed tab 592 within the concentric circular antennas 585 in an embodiment. Further, while concentric circular antennas 585 are discussed in embodiments herein, any shape of concentric antennas for the passive portions of the metasurface unit cell 598 may be used. Again, the passive sets of concentric circular antennas 585 of the unit cells 598 may receive those incident EM waves and transfer the EM wave radiofrequency signal through a coupler 575 and to a microwave circuit forming part of the microwave circuit network 595 with each of the plurality of microwave circuits placed below each of the passive set of concentric circular antennas 585 of each metasurface unit cell 598. The microwave circuit of each metasurface unit cell 598 acts as the processing units that manipulate the captured EM wave energy of the capture incident radiofrequency signal at the passive set of concentric circular antennas 585 and couplers 575 by receiving those capture radiofrequency signals from the passive set of concentric circular antennas 585 and couplers 575 and those captured radiofrequency signals being sent to the power combiner circuit (not shown) to synthesize a unified waveform for further manipulation for phase shifting or alignment in a reflected radiofrequency circuit.

In an embodiment, one or more impedance match junctions 583 formed between each of the microwave circuits of the microwave circuit network 595 may be used to direct those captured radiofrequency signals from each of the microwave circuits to a signal matching circuit 589, via a signal send/return path 593, that optimizes signal flow into other processing elements described herein and minimizes distortion or power loss of the captured radiofrequency signal. In an embodiment, the signal matching circuit 589 ensures that optimal impedance alignment as energy flows from the microwave circuits. In an embodiment, the signal matching circuit 589 refines impedance alignment thereby enhancing the signal quality from each of the microwave circuits of each of the unit cells 598 thereby minimizing potential power losses and distortion during transmission of those captured radiofrequency signals for manipulation and reflection back via the metasurface unit cell array 562.

After the impedance of each signal from each of the microwave circuits of the microwave circuit network 595 has been matched using the signal matching circuit 589, the captured, incident radiofrequency signal may be adjusted at the attenuator circuit 584 and tunable delay circuit 586 based on a bias reference input provided at a bias interconnect 587 operatively coupled to the hardware processor and metasurface controller of the information handling system. In an embodiment, the bias reference input from the bias interconnect 587 is received as input actuation voltage to the attenuator circuit 584 and tunable delay circuit 586 to select an amplitude level and a phase-shift level to be applied to the EM waves of the captured, incident radiofrequency signal from the signal matching circuit 589. The tunable delay circuit 586 may apply a phase shift to the captured, incident radiofrequency signal EM waves so as to align or oppose the phase of the wavefronts at various phase-shift level of reflected radiofrequency signals by the one or more metasurface unit cells 598 with the wavefronts of the captured incident radiofrequency signal and thereby contributing to constructive or destructive interference patterns created at the metasurface unit cell array 562. In an embodiment, the attenuator circuit 584 also adjusts the amplitude of the incoming captured, incident radiofrequency signal with voltage divider circuits selected at the signal matching circuit 589 based on the bias reference input provided at the bias interconnect 587. The bias reference input is an actuation voltage to dictate the attenuation level and phase-shift level needed from the attenuator circuit 584 and the tunable delay circuit 586 to achieve the desired signal strength within the null region or to increase EM wave radiofrequency signals at directional EMF radiofrequency signal lobes when radiofrequency bandwidth is needed.

In an embodiment, the metasurface unit cell array 562 may include one or more connection pads 591 that allow the metasurface controller and/or hardware controller to be operatively coupled to the power combiner, attenuator circuit 584, tunable delay circuit 586, and other elements on the metasurface unit cell array 562. It is appreciated that various connection pads 591 may be formed below a substrate 597 layer of the metasurface unit cell array 562 with leads passing through the substrate 597 and to the various elements such as the tunable delay circuit 486 and attenuator circuit 584. Additionally, the metasurface unit cell array 562 may include a microstrip ground 577 that may act as a grounding source for the various circuits in the metasurface unit cell array 562 as well as a shielding from electrical interference. Still further, a first dielectric layer 581 and second dielectric layer 579 may also be placed within the stack of the metasurface unit cell array 562 such that the couplers 575 are electrically insulated from both the passive set of concentric circular antennas 585 and microwave circuit network 595.

Figure 6:
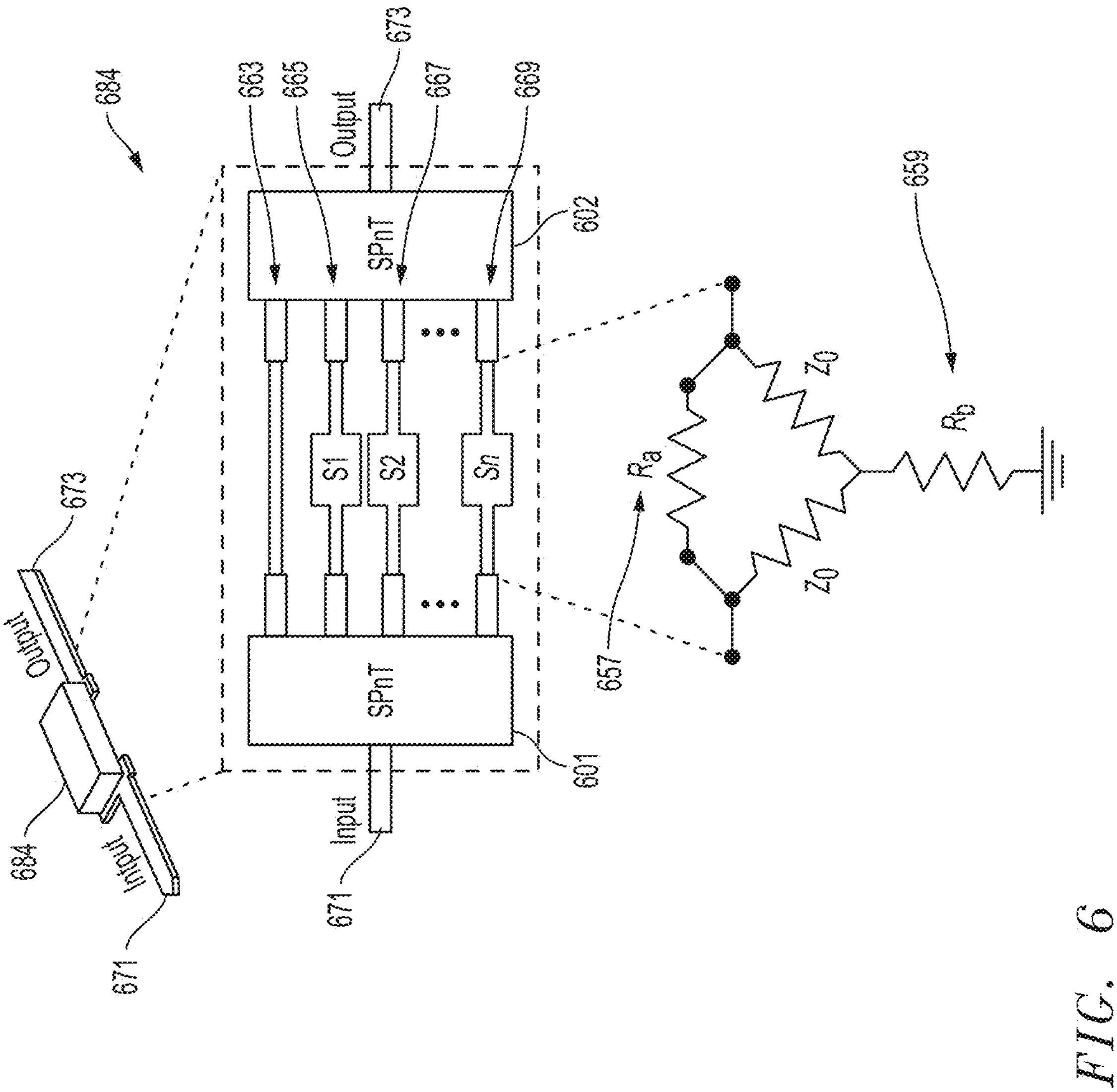
FIG. 6 is a graphic diagram illustrating an attenuator circuit according to an embodiment of the present disclosure.

FIG. 6 is a graphic diagram illustrating an attenuator circuit according to an embodiment of the present disclosure. The attenuator circuit 684 may include an input lead 671 to receive the captured radiofrequency signal from the microwave circuit and the bias reference input signal from the metasurface controller that would define to what extent the EMF is to be attenuated by the metasurface unit cell array. The attenuator circuit 684 also includes an output that passes the output signal through the signal send/return path (e.g., FIG. 4, 493) to the microwave circuit network (FIG. 5, 595).

The attenuator circuit 684 may be a stepped attenuator circuit 684 that includes plural single-pole, multi-throw switches (SPnT) 602 and 603. Between the input lead 671 and output lead 673, therefore, a plurality of attenuation resistor networks 663, 665, 667, 669 may be formed such that the signal may be step attenuated. In an embodiment, a first attenuation resistor network 663 may not include any resistor network thereby allowing for no attenuation of the signal. A second attenuation resistor network 665 may include a resistor network that attenuates the signal at a first step. As with the third attenuation resistor network 667 and nth attenuation resistor network 669, the resistor network may be formed using a first resistor 657 and a second resistor 659. The selection of the first resistor 657 and second resistor 659 may be commensurate with the matched impedance Zo for attenuation resistor network 665, 667, 669. In an embodiment, each of the second attenuation resistor network 665, the third attenuation resistor network 667, and the nth attenuation resistor network 669 may be a T-pad attenuation resistor network with resistors that are chosen to achieve the desired level of attenuation while also maintaining impedance matching. The resistors associated with the matched impedance Zo are selected to ensure that the input and output impedance of the attenuator circuit 684 match the characteristic impedance of the transmitting signal while also ensuring power transfer and preventing reflection of the captured or manipulated radiofrequency signal to avoid power loss or distortion.

Figure 7:
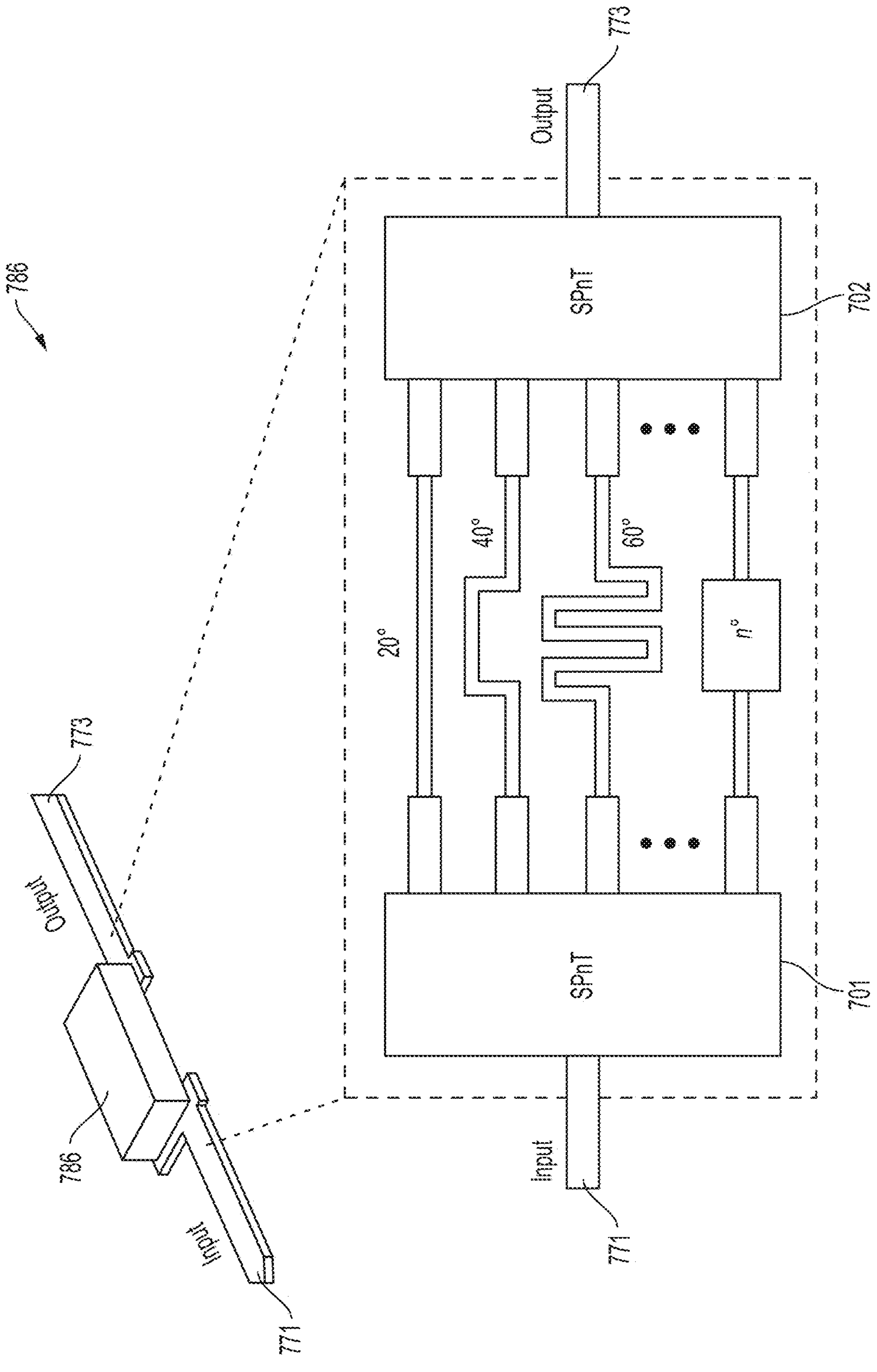
FIG. 7 graphic diagram illustrating a tunable delay circuit according to an embodiment of the present disclosure.

FIG. 7 graphic diagram illustrating a tunable delay circuit according to an embodiment of the present disclosure. Similar to the attenuator circuit described in FIG. 6, 684, the tunable delay circuit 786 includes an input 771 lead to receive the signal from signal matching circuit and provide, at the output lead 773, a delayed version of the input signal. The tunable delay circuit 786 may be a tunable delay circuit 786 that includes plural single-pole, multi-throw switches (SPnT) 701 and 702. Between the input lead 771 and output lead 773, therefore, a plurality of resistive delay circuits that result in different delay timings. For example, a first resistive delay circuit 649 may be formed that provides a first resistive delay that creates a 20° phase shift in the output signal at the tunable delay circuit 786. A second resistive delay circuit 651 may provide a 40° phase shift in the output signal. A third resistive delay circuit 653 may provide a 60° phase shift in the output signal. Additionally, a fourth resistive delay circuit 655 may provide a n° phase shift in the output signal. It is appreciated that the length of the transmission lines for each of the first resistive delay circuit 649, second resistive delay circuit 651, third resistive delay circuit 653, and fourth resistive delay circuit 655 may be shortened or lengthened to change the phase shift in the output signal. Thus, the present specification contemplates that more than four different resistive delay circuits may be formed into the tunable delay circuit 786 to allow for more stepped phase shifting in the tunable delay circuit 786.

Figure 8B:
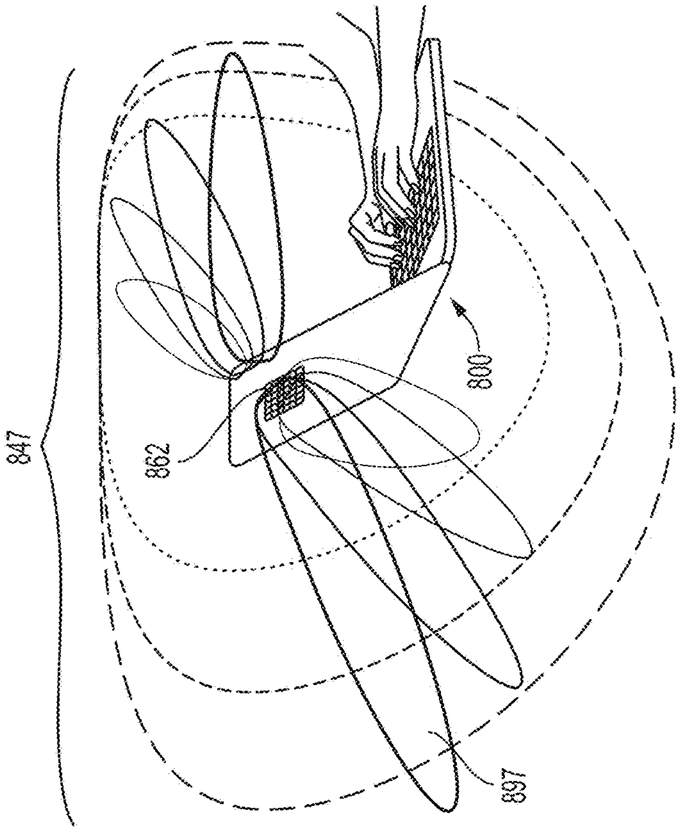
FIG. 8B is a graphic diagram showing an EMF without a null region being created by the metasurface unit cell array according to an embodiment of the present disclosure.
Figure 8A:
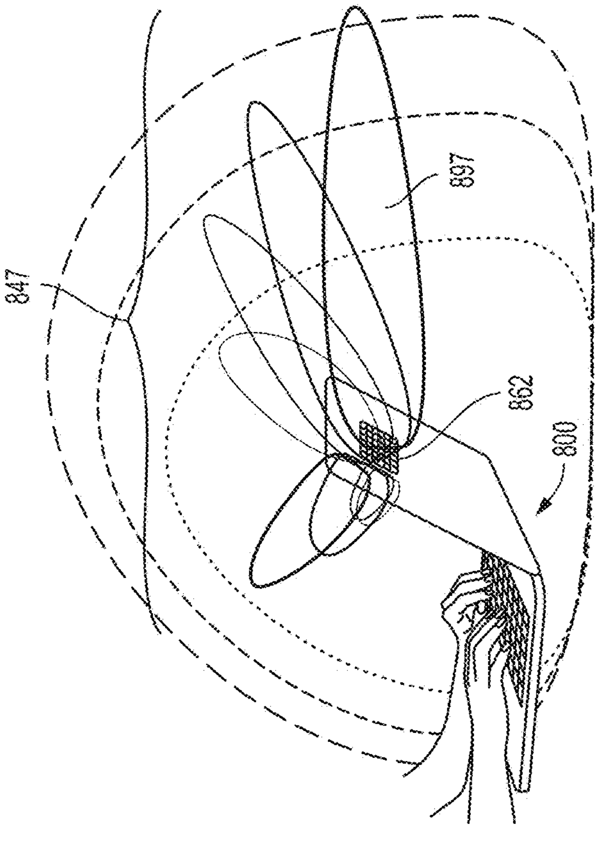
FIG. 8A is a graphic diagram showing an EMF distribution with a null region created via actuation of the metasurface unit cell array according to an embodiment of the present disclosure.

FIG. 8A is a graphic diagram showing an EMF with a null region created via actuation of the metasurface unit cell array according to an embodiment of the present disclosure. FIG. 8B is a graphic diagram showing an EMF without a null region not being created by the metasurface unit cell array according to an embodiment of the present disclosure. FIG. 8A shows an EMF 847 that includes EMF radiofrequency signal lobes 897 that are directed out from the metasurface unit cell array 862 and information handling system 800 with a null region created at or towards the user of the information handling system 800. FIG. 8A therefore shows an example of the information handling system 800 being placed in an EMF mitigation mode.

FIG. 8B shows an EMF 847 that includes EMF radio frequency signal lobes 897 that are allowed to be omnidirectional, including being directed towards a user. In this example, the metasurface unit cell array 862 is being operated by the information handling system 800 in a signal control mode that allows for larger bandwidths.

Figure 9:
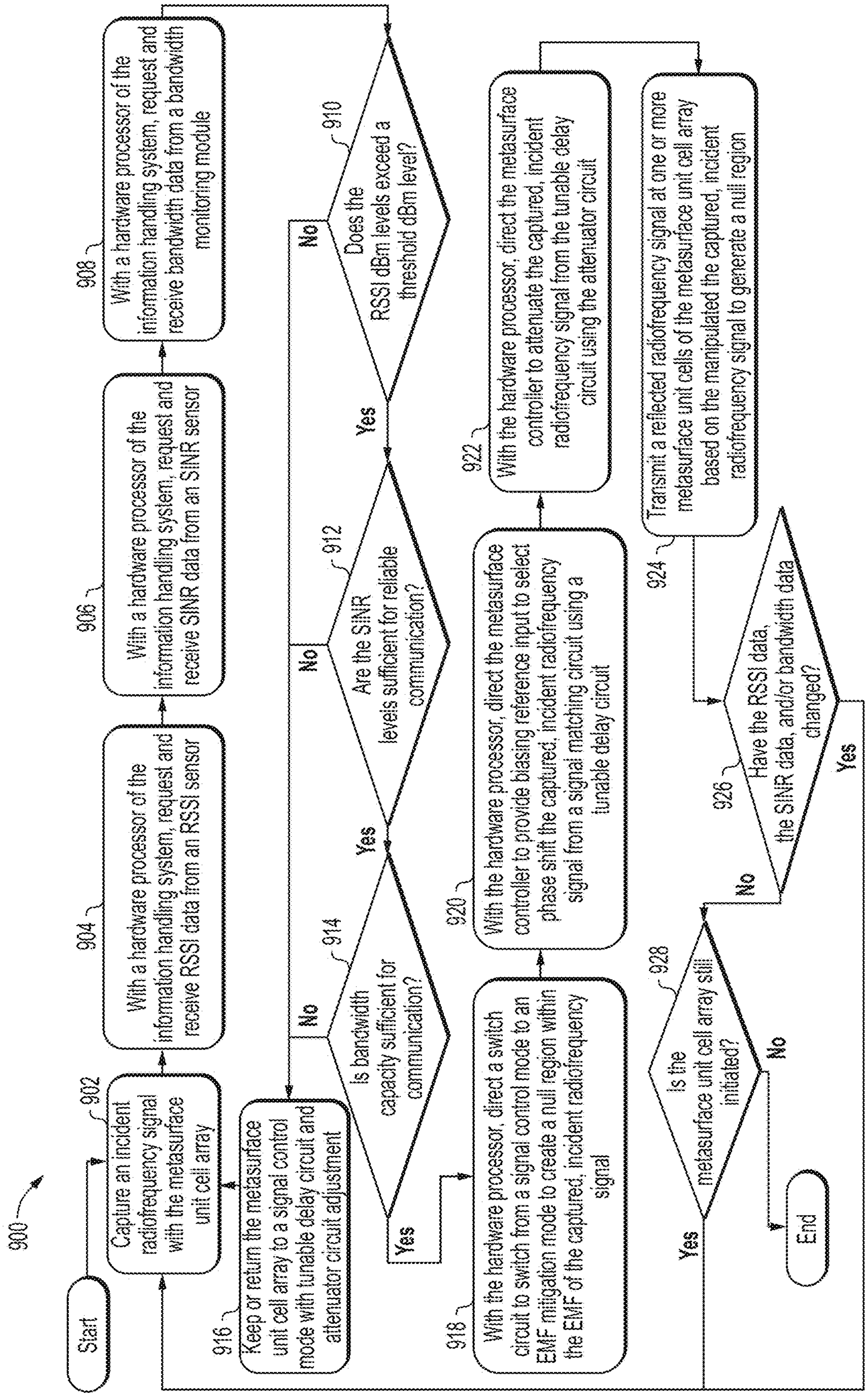
FIG. 9 is a flow diagram of a method of mitigating an EMF radiation exposure to a user with a metasurface unit cell array formed on an information handling system according to another embodiment of the present disclosure.

FIG. 9 is a block diagram of a method 900 of mitigating an EMF at a metasurface unit cell array formed on an information handling system according to another embodiment of the present disclosure. The metasurface unit cell array used in this method may be similar to those metasurface unit cell arrays described in connection with, for example, FIGS. 1, through 5. The metasurface unit cell array may include a plurality of unit cells that are controlled using a metasurface PMU or other power source, a metasurface controller, a tunable delay circuit, and an attenuator circuit or other components as described herein.

At block 902, the method 900 may include initiating the information handling system and the metasurface unit cell array. In an embodiment, the information handling system may be initiated by a user actuating a power button at the information handling system. In an example embodiment, the PMU of the information handling system may then proceed to power a metasurface controller such as an FPGA. In an embodiment, the metasurface unit cell array may be placed on a surface where EM waves may arrive at the metasurface unit cell array. These surfaces may include an A-cover of an information handling system such as that shown in FIG. 2. Upon initiation or during operation of the metasurface unit cell array, any incident radiofrequency signal EM waves may be capture by the metasurface unit cells and, with a microwave coupler and microwave circuitry, the captured, incident radiofrequency signals may be manipulated for phase shift with a tunable delay circuit and amplitude level with an attenuator circuit to generate a reflected radiofrequency signal at any of one or more metasurface unit cells in the metasurface unit cell array according to embodiments herein. The reflected radiofrequency signal at any of the one or more metasurface unit cells may variously generate a null region or directional EM wave radiofrequency signal transmission or reception nodes with the incident radiofrequency signals at the metasurface unit cell array in the embodiments of the present disclosure.

At block 904, the method 900 may include requesting and receiving RSSI data from an RSSI sensor. In an embodiment, the hardware processor of the information handling system may execute computer-readable program code of an adaptive EMF mitigation system module that accesses an RSSI sensor. The RSSI sensor provides RSSI data to the hardware processor. The hardware processor of the information handling system may cause an RSSI sensor, such as antenna and radio system on the information handling system, to sense current RSSI at the information handling system. This RSSI sensor detects the signal environment at and around the information handling system by measuring the strength of the EM signals received at the information handling system. This request of RSSI data causes the RSSI sensor to send RSSI data back to the hardware processor of the information handling system in an embodiment. The RSSI levels may indicate sufficient or insufficient radiofrequency signal strength for transmission or reception of radiofrequency communications. This determination may trigger whether increase or decrease, stepwise or entirely, the size or level of the null region created or eliminate the null region entirely so that higher radiofrequency signal power levels may be transmitted.

At block 906, the method 900 also includes requesting and receiving SINR data from an SINR. Again, the hardware processor of the information handling system may execute computer-readable program code of an adaptive EMF mitigation system module that accesses an SINR sensor. The SINR sensor provides the SINR data to the hardware processor. Similarly, the hardware processor at the information handling system may direct the SINR sensor to gather and send SINR data back to the hardware processor on the signal to noise ratio of radiofrequency signals being used for radiofrequency signal communications from a radio system and antennas of the information handling system. The SINR sensor evaluates the quality of wireless signals emitted or received from external sources by the antennas of the information handling system.

At block 908, the method 900 further includes requesting and receiving bandwidth data associated with current bandwidth requirements at the information handling system. In an embodiment, the hardware processor may execute computer-readable program code instructions of a bandwidth monitoring module to determine current bandwidth requirements and report those bandwidth requirements to the hardware processor. The bandwidth monitoring module may assess current and real-time bandwidth requirements of the information handling system to ensure that wireless communication meets the user's needs while minimizing unnecessary EM wave emissions. For example, the user may execute computer-readable program code of an online gaming or video streaming software application. In so doing, the bandwidth requirements at the information handling system may increase such that creation of the null region may prevent an increase in bandwidth capacity at the information handling system. As such, the hardware processor, detecting an increase in bandwidth requirements via operation of the bandwidth monitoring module, may decrease the size of the null region created or eliminate the null region so that higher amounts of data may be transmitted.

At block 910, the hardware processor may execute computer-readable program code of the adaptive EMF mitigation system module to determine if the RSSI data includes RSSI dBm levels that exceed a dBm level. In an embodiment, the RSSI sensor supplies real-time data to the hardware processor with dBm levels with the hardware processor to compare current dBm levels to a baseline threshold dBm level to determine if the threshold dBm level has been exceeded that may create an EMF that is to be mitigated via operation of the metasurface unit cell array. Where the RSSI dBm detected does exceed the threshold dBm level, the method 900 proceeds to block 912 as described herein. However, if the RSSI dBm detected does not exceed the threshold dBm level, the method 900 proceeds to block 916.

At block 912, the hardware processor executes computer-readable program code instructions of the adaptive EMF mitigation system module to determine if the SINR levels detected by the SINR sensor are sufficient for reliable communication between the information handling system and other devices within the wireless environment. Where the SINR levels are sufficient for such communications, the method 900 continues to block 914 as described herein. Where the signal-to-noise ration in the SINR levels are not sufficient to establish communications between the information handling system and other wireless communications devices, the method 900 continues to block 916. It is appreciated that where the signal-to-noise ratio is high, the creation of a null region in order to mitigate EMF directed at the user may further hamper the ability of the information handling system to wirelessly communicate with other wireless devices.

At block 914, the hardware processor may execute the computer-readable program code of the adaptive EMF mitigation system module to also determine if the bandwidth capacity of the wireless communications employed by the information handling system are sufficient for such communications. Again, in some instances, the user may execute computer-readable program code of an online gaming or video streaming software application. In so doing, the bandwidth requirements at the information handling system may increase with current bandwidth capacity rates not being sufficient to provide throughput. Where current bandwidth requirements are sufficient, the method 900 may continue to block 918. However, where detected current bandwidth requirements are not sufficient, the method 900 continues to block 916.

At block 916, the metasurface unit cell array is kept in or transitioned to a signal control mode with no null region being created or any null region that was effective is reduced or turned off with step-wise reduction of phase shifting by the tunable phase-shifting circuit or step-wise attenuation by the attenuator circuit in embodiments herein. This is because creation or maintaining of the null region as described herein may reduce the RSSI, SINR, or throughput of radiofrequency signal data transceived by the antennas of the information handling system below an acceptable level for radiofrequency signal communications. As such, due to relatively higher levels of bandwidth, SINR or RSSI required, the mitigation of the EMF created by the operation of the antennas is not carried out or is step-wise reduced or eliminated at block 916. Triggering changes to the tunable delay circuit and attenuator circuit with bias reference input voltages by the metasurface controller at one or more metasurface unit cells may stepwise reduce or eliminate the null region and may generate one or more EM wave radiofrequency transmission or reception nodes with the metasurface unit cell array according to the embodiments described herein.

In an example embodiment, because the hardware processor is continuously monitoring RSSI data, SINR data, or bandwidth data in any combination at blocks 910, 912, and 914, this data may change and, as a result, may indicate to the hardware processor that the metasurface unit cell array should be switched from operating under the EMF mitigation mode and begin to operate under the signal control mode at block 916. In order to switch from the EMF mitigation mode to the signal control mode, the method 900 includes directing the tunable delay circuit to remove any phase offset. As described herein, this may include switching the phase shift degrees of the tunable delay circuit via the SPnT circuit of the tunable delay circuit with a bias reference input voltage to actuate the SPnT circuit at the tunable delay circuit. In an embodiment, the previously set phase offset for creation of a null region of some level may be undone to remove the phase offset. This may be done in a step-wise reduction to gradually reduce the level of the null offset while increasing radiofrequency signal levels in the signal control mode. Additionally, the attenuation of the EMF may be deactivated or reduced at 916.

In an embodiment, this deactivation of the attenuation may also include switching the SPnT to a first attenuation resistor network (e.g., 663, FIG. 6) of the attenuator circuit with a bias reference input to set an amplitude of attenuation for the reflected radiofrequency signal to adjust its level of impact on the incident radiofrequency signals at the metasurface unit cell array. In an embodiment, a step-wise reduction of the amplitude may be completed with the SPnT circuitry of the attenuator circuit moving the attenuation effect until the bandwidth requirements of the information handling system have been met. This step-wise reduction in the attenuation may allow for a level of EMF mitigation while still meeting a level of increased bandwidth requirements.

As described, where the RSSI levels exceed a threshold dBm level at block 910, the SINR levels are sufficient for reliable communication at block 912, or the bandwidth capacity sufficient for wireless communication at block 914, EMF mitigation may be used such that a null region may be created within the EMF so that the EMF may be mitigated, at least, in front of the information handling system where the user may be seated. This mitigates the effects of EMFs created via operation of the various antennas (e.g., 5G-NR antennas, WiFi 2.4/5/6 GHz antennas and the like). The method may then proceed to block 918. The present embodiment of FIG. 9 shows that detection of each of the RSSI levels exceeding a threshold dBm level at block 910, the SINR levels being sufficient for reliable communication at block 912, and the bandwidth capacity being sufficient for wireless communication at block 914 must be satisfied before an EMF mitigation mode is triggered at block 918. However, it is contemplated that any one of or any combination of the RSSI levels exceeding a threshold dBm level at block 910, the SINR levels being sufficient for reliable communication at block 912, or the bandwidth capacity being sufficient for wireless communication at block 914 may be used when triggering the EMF mitigation mode at block 918 and the embodiment of FIG. 9 contemplates various embodiments using any one or any combination of the above determinations of radiofrequency signal levels at the information handling system.

Where, based on any combination of the RSSI data, SINR data, or bandwidth data the hardware processor determines that EMF mitigation is required, the method 900 continued to block 918. It is appreciated that certain thresholds may be defined such that the hardware processor may determine whether to enter an EMF mitigation mode or remain operating within a signal control mode. For example, the RSSI sensor supplies real-time data to the hardware processor with dBm levels with the hardware processor to compare current dBm levels to a baseline dBm level to determine if a threshold dBm level has been exceeded that may indicate that the hardware processor should place the information handling system in an EMF mitigation mode. Additionally, the SINR sensor may help to determine whether the signal-to-noise conditions are sufficient for reliable communication between the information handling system and other receiving/transmitting devices within the environment. As described herein, the data received by the hardware processor from the SINR sensor helps to determine whether a null region is to be created within the EMF at the information handling system or not and may help to determine if, as a result of a threshold level of signal-to-noise ratio being reached, the metasurface unit cell array should create a constructive interference EM wave to increase outgoing EM wave nodes to overcome the detected noise. Still further, a detected increase in bandwidth requirements beyond a threshold bandwidth level may indicate to the hardware processor that the information handling system should be placed into a signal control mode instead of an EMF mitigation mode.

At block 918, the hardware processor may access a switch circuit to switch the operation of the information handling system from a signal control mode to an EMF mitigation mode in order to create the null region within the EMF using the operations of the metasurface unit cell array. This switch circuit may allow a metasurface controller, under the direction of the hardware controller of the information handling system, to reconfigure the operation of the metasurface unit cell by, at least, phase shifting and attenuation of the EM waves incident to the metasurface unit cell array. The hardware processor signals the metasurface controller to control the tunable delay circuit to apply a phase shift offset at one or more unit cells of the metasurface unit cell array as described herein at block 920 below. This phase shift offset may be initiated when the bandwidth threshold has not been reached and the RSSI data threshold and SINR data thresholds have been reached. In an example embodiment, the tunable delay circuit may introduce controlled delays to incoming EM wave signals at the metasurface unit cell array thereby altering the phase of the signals and allowing those signals to be shifted forward or backward in time. This allows for the hardware processor 902 and metasurface controller 978 to control the creation of destructive interference signals, constructive interference signals, or both in order to create the null region. Further, the attenuator circuit may be used by the metasurface controller to adjust the amplitude of a reflected radiofrequency signal to lowering signal strength and minimizing the power of EM waves of the incident radiofrequency signals in regions where nullification or mitigation is required such as at the null region where the user is present in front of the information handling system.

At block 920, the method 900 may include directing, via the hardware processor, the metasurface controller to phase shift the captured, incident radiofrequency signal from a signal matching circuit using a tunable delay circuit. In an embodiment, the metasurface unit cell array includes a plurality of unit cells that each receive incident EM waves of the captured, incident radiofrequency signal that have been propagated omnidirectionally from one or more of the antennas of the information handling system or elsewhere in the radiofrequency environment around the metasurface unit cell array at the information handling system. A set of passive concentric circular resonating antennas of the metasurface unit cells may receive those incident EM waves of the captured, incident radiofrequency signal and transfer the EM wave resonance through a coupler and to a microwave circuit placed below the passive concentric circular resonating antennas of each metasurface unit cell. The microwave circuit of each metasurface unit cell acts as the processing units for manipulation of the captured EM wave energy of the captured, incident radiofrequency signals from the passive concentric circular resonating antennas and couplers by receiving captured, incident radiofrequency signals from the passive concentric circular resonating antennas and couplers which are sent to a power combiner circuit to synthesize a unified waveform for manipulation at the tunable delay circuit and an attenuator circuit. In an embodiment, one or more impedance match junctions between each of the microwave circuits may be used to direct those signals from each microwave circuit to a signal matching circuit that optimizes signal flow into other processing elements, such as tunable delay circuit or the attenuator circuit described herein.

The tunable delay circuit may apply a selected phase shift level to the captured, incident radiofrequency signal received from each microwave circuit pursuant to a bias reference input from the hardware processor applied to the tunable delay circuit in order to determine to what degree to phase shift is to be applied to the captured, incident radiofrequency signal to generate a reflected radiofrequency signal at the metasurface unit cell array in order to create the null region. Again, as described in connection with FIG. 7, for example, the tunable delay circuit may phase shift the captured, incident radiofrequency signal to any degree based on selection of a phase-shifting element with a switch circuit and a biasing reference input voltage in order to create varying degrees of destructive interference patterns, constructive interference patterns, or both within the EM waves. Metasurface controller signals the tunable delay circuit with a biasing reference input voltage to apply a phase shift offset at one or more unit cells of the metasurface unit cell array as described herein. This phase shift offset may be initiated when any combination of monitored radiofrequency performance at the information handling system of the bandwidth threshold has been reached, the RSSI data threshold has been reached, or the SINR data thresholds have been reached. In an example embodiment, the tunable delay circuit may introduce controlled delays to incoming EM wave captured, incident radiofrequency signals at the metasurface unit cell array thereby altering the phase of the signals and allowing those signals to be shifted forward or backward in time. This allows for the hardware processor and metasurface controller to control the creation of destructive interference signals, constructive interference signals, or both in order to create the null region at block 920. In some embodiments, the tunable delay circuit may signal to the metasurface controller that the phase shift has been applied. Additionally, the hardware processor or the metasurface controller may control the selection of metasurface unit cells to have phase shift adjusted to create a null region as well as any direction EMF radiofrequency signal transmission or reception lobes with the metasurface unit cell array. For example, a null region is created at the metasurface unit cell array using the metasurface controller. In an embodiment, the metasurface controller may access a look-up table or other data source that indicates which metasurface unit cells within the metasurface unit cell array are to have the phase shift and attenuation applied to it in order to create the constructive or destructive interference patterns used to form the null region within the EMF.

Additionally, at block 922, the signals emitted by the various antennas and captured as captured, incident radiofrequency signals at the metasurface unit cell array may be attenuated. Thus, the hardware processor may direct the metasurface controller to provide a bias reference input voltage to attenuate the captured, incident radiofrequency signals from the metasurface unit cell array using a tunable attenuator circuit to select an attenuation level for amplitude of the reflected signal being generated for the one or more metasurface unit cells. In an embodiment, the attenuator circuit also receives the biasing reference circuit to select a voltage divider at the attenuator circuit to adjust the amplitude of the incoming captured, incident radiofrequency signal from the signal matching circuit to apply an attenuation level to the amplitude needed to achieve the desired signal strength within the null region or to adjust any EMF radiofrequency signal transmission lobes in embodiments herein. The attenuator circuits are activated to selectively attenuate the captured, incident radiofrequency signals from the metasurface unit cell array. Thus, the attenuator circuit may be used by the metasurface controller to adjust the amplitude of the reflected radiofrequency signal outgoing EM wave signals for applying constructive or destructive interference thereby lowering signal strength and minimizing the power of EM waves in regions where nullification or mitigation is required such as at the null region where the user is present in front of the information handling system. The metasurface controller may send a bias reference input voltage to the attenuator circuit to select among a voltage divider as described with respect to FIG. 6 above. In some embodiments, the attenuator circuit may signal to the metasurface controller that the signal amplitudes have been attenuated or adjusted to a given amount.

At block 924, the captured, incident radiofrequency signals that have been manipulated for phase-shifting with the selected phase-shift level by the tunable delay circuit and the for attenuation level by the tunable attenuation circuit are then transmitted as a reflected radiofrequency signal. For example, the reflected radiofrequency signal is fed back to one or more metasurface unit cell to generate a null region or any direction EM wave radiofrequency signal transmission or reception lobes created at the metasurface unit cell array. In an embodiment, the metasurface controller may access a look-up table or other data source that indicates which metasurface unit cells within the metasurface unit cell array are to have the phase shift and attenuation applied to it in order to create the constructive or destructive interference patterns used to form the null region within the EMF or any applicable EM wave radiofrequency signal transmission or reception lobes.

The reflected radiofrequency signal is fed back to the selected one or more metasurface unit cells for transmission to provide destructive interference to the incident radiofrequency signals to provide a null region of various levels in an embodiment. The reflected radiofrequency signal is fed back to one or more metasurface unit cells for transmission to provide constructive interference to the incident radiofrequency signals to provide a directional EMF radiofrequency signal transmission or reception lobe in other embodiments.

At block 926 the hardware processor may monitor for and determine if the RSSI data, the SINR data, and/or bandwidth data has changed. Changes in this data may indicate that the EMF no longer should be attenuated or phase shifted due to, for example, needed extra bandwidth, decreases in signal-to-noise ratios, and/or RSSI dBm levels now exceed the dBm threshold. Where any of these parameters have changed at block 924, the method 900 returns to block 902 to once again reevaluate this data. Where no changes in this data has been detected at block 926, the method 900 continues to block 928.

At block 928, the method 900 includes determining if the metasurface unit cell array and information handling system are still initiated. Where the metasurface unit cell array and information handling system are still initiated, the method 900 proceeds to block 902 with the metasurface unit cell array capturing incident radiofrequency signals and the information handling system continuing to monitor for changes in bandwidth requirements, RSSI data, and/or SINR data as described herein. Where the metasurface unit cell array and information handling system are no longer initiated, the method 900 may end here.

The processes or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:

a hardware processor, a memory device, and a power management unit (PMU) to provide power to the hardware processor and memory device;

a metasurface unit cell array operatively coupled to a chassis surface of the information handling system to manipulate electromagnetic (EM) waves of an incident radiofrequency signal, the metasurface unit cell array including a plurality of metasurface unit cells each metasurface unit cell including a passive set of concentric antennas to receive the incident radiofrequency signal;

a microwave circuit coupled to the set of concentric antennas via a passive coupler, wherein the microwave circuit is configured to capture the incident radiofrequency signal from the concentric antennas and perform phase modulation of the captured, incident radiofrequency signal with a tunable delay circuit controlled by a metasurface controller;

the hardware processor to execute computer-readable program code instructions of an adaptive mitigation system module to determine when the radiofrequency signal is meets a sufficient radiofrequency signal communication threshold selected from a signal strength indicator (RSSI) threshold level from an RSSI sensor, a signal-to-interference-plus-noise ratio (SINR) threshold level from an SINR sensor, or a wireless bandwidth requirement level at the information handling system to trigger electromagnetic field (EMF) mitigation with the metasurface unit cell array; and the metasurface controller to send a bias voltage to a tunable delay circuit to phase shift the captured, incident radiofrequency signal to generate a reflected radiofrequency signal at a first metasurface unit cell to create interference patterns in the incoming incident radiofrequency signal to create a null region within the EM waves of the incident radiofrequency signal on one side of the information handling system.

2. The information handling system of claim 1, wherein the chassis surface is a display chassis lid cover of the information handling system.

3. The information handling system of claim 1 further comprising:

the metasurface controller to send the bias voltage to an attenuator circuit to adjust the amplitude of the reflected radiofrequency signal at the first metasurface unit cell to adjust a level of destructive interference to the incident radiofrequency signal within the null region created by phase adjustment operation of the tunable delay circuit.

4. The information handling system of claim 1 further comprising:

the metasurface controller to send the bias voltage to the tunable delay circuit to phase shift the captured, incident radiofrequency signal to generate the reflected radiofrequency signal at a second metasurface unit cell for interference patterns in the incoming EM waves of the incident radiofrequency signal to create directional EM wave radiofrequency transmission or reception lobes within the EM waves of the incident radiofrequency signal on a second side of the information handling system.

5. The information handling system of claim 1, wherein the concentric antennas are concentric circular antennas.

6. The information handling system of claim 1 further comprising:

a metal fixed tab formed within the passive set of concentric antennas.

7. The information handling system of claim 1 further comprising:

a signal matching circuit operatively coupled to each of the microwave circuits of the plurality of metasurface unit cells to match the impedance received from each of the plurality of microwave circuits prior to feeding the captured, incident radiofrequency signal to the tunable delay circuit for phase shifting.

8. The information handling system of claim 1 further comprising:

the hardware processor to execute computer-readable program code instructions of an adaptive mitigation system module to determine when the radiofrequency signal does not meet a sufficient radiofrequency signal communication threshold selected from a signal strength indicator (RSSI) threshold level from an RSSI sensor, a signal-to-interference-plus-noise ratio (SINR) threshold level from an SINR sensor, or a wireless bandwidth requirement level at the information handling system; and the metasurface controller to send the bias voltage to the tunable delay circuit to execute a step reduction in phase shift of the captured radiofrequency signal to generate a reflected radiofrequency signal at the first metasurface unit cell to create the interference patterns in the incoming EM waves of the incident radiofrequency signal to reduce the null region within the EM waves of the incident radiofrequency signal on the one side of the information handling system to improve radiofrequency signal communication.

9. A method of mitigating an electromagnetic field (EMF) at a metasurface unit cell array formed on an information handling system, comprising:

receiving electromagnetic (EM) waves of an incident radiofrequency signal at a metasurface unit cell array operatively coupled to a chassis surface of the information handling system, where the metasurface unit cell array includes a plurality of metasurface unit cells and each metasurface unit cell including a passive set of concentric antennas to receive the incident radiofrequency signal;

capturing the incident radiofrequency signal from the concentric antennas via a microwave circuit coupled to the set of concentric antennas and a passive coupler, wherein the microwave circuit is configured to and perform phase modulation of the captured, incident radiofrequency signal with a tunable delay circuit controlled by a metasurface controller;

executing computer-readable program code instructions, via a hardware processor of the information handling system, of an adaptive mitigation system module to determine when the radiofrequency signal is meets a sufficient radiofrequency signal communication threshold selected from a signal strength indicator (RSSI) threshold level from an RSSI sensor, a signal-to-interference-plus-noise ratio (SINR) threshold level from an SINR sensor, or a wireless bandwidth requirement level at the information handling system to trigger electromagnetic field (EMF) mitigation with the metasurface unit cell array;

sending a bias voltage, via the metasurface controller, to a tunable delay circuit to phase shift the captured, incident radiofrequency signal to generate a reflected radiofrequency signal at a first metasurface unit cell to create interference patterns in the incoming incident radiofrequency signal to create a null region within the EM waves of the incident radiofrequency signal on one side of the information handling system; and sending the bias voltage to the tunable delay circuit to phase shift the captured, incident radiofrequency signal to generate a reflected radiofrequency signal at a second metasurface unit cell for interference patterns in the incoming EM waves of the incident radiofrequency signal to create directional EM wave radiofrequency transmission or reception lobes within the EM waves of the incident radiofrequency signal on a second side of the information handling system.

10. The method of claim 9, wherein the chassis surface is a display chassis lid cover of the information handling system.

11. The method of claim 9, wherein the chassis surface is a tablet chassis of the information handling system.

12. The method of claim 9 further comprising:

sending the bias voltage to an attenuator circuit to adjust the amplitude of the reflected radiofrequency signal at the first metasurface unit cell to adjust a level of destructive interference to the incident radiofrequency signal within the null region created by phase adjustment operation of the tunable delay circuit.

13. The method of claim 9 further comprising:

executing computer-readable program code instructions of the adaptive mitigation system module to determine that the radiofrequency signal does not meet a sufficient radiofrequency signal communication threshold selected from a signal strength indicator (RSSI) threshold level from an RSSI sensor, a signal-to-interference-plus-noise ratio (SINR) threshold level from an SINR sensor, or a wireless bandwidth requirement level at the information handling system; and to sending the bias voltage to the tunable delay circuit to execute a step reduction in phase shift of the captured, incident radiofrequency signal to generate the reflected radiofrequency signal at the first metasurface unit cell to create the interference patterns in the incoming EM waves of the incident radiofrequency signal to reduce the null region within the EM waves of the incident radiofrequency signal on the one side of the information handling system to improve radiofrequency signal communication.

14. An information handling system comprising:

a hardware processor, a memory device, and a power management unit (PMU) to provide power to the hardware processor and memory device;

a metasurface unit cell array operatively coupled to a chassis surface of the information handling system to manipulate electromagnetic (EM) waves of an incident radiofrequency signal, the metasurface unit cell array including a plurality of metasurface unit cells each metasurface unit cell including a passive set of concentric antennas to receive the incident radiofrequency signal;

a microwave circuit coupled to the set of concentric antennas via a passive coupler, wherein the microwave circuit is configured to capture the incident radiofrequency signal from the concentric antennas and perform phase modulation of the captured, incident radiofrequency signal with a tunable delay circuit controlled by a metasurface controller;

the hardware processor to execute computer-readable program code instructions of an adaptive mitigation system module to determine when the radiofrequency signal is meets a sufficient radiofrequency signal communication threshold selected from a signal strength indicator (RSSI) threshold level from an RSSI sensor, a signal-to-interference-plus-noise ratio (SINR) threshold level from an SINR sensor, or a wireless bandwidth requirement level at the information handling system to trigger electromagnetic field (EMF) mitigation with the metasurface unit cell array;

the metasurface controller to send a bias voltage to a tunable delay circuit to phase shift the captured, incident radiofrequency signal to generate a reflected radiofrequency signal at a first metasurface unit cell to create interference patterns in the incoming incident radiofrequency signal to create a null region within the EM waves of the incident radiofrequency signal on one side of the information handling system; and the metasurface controller to send the bias voltage to an attenuator circuit to adjust the amplitude of the reflected radiofrequency signal at the first metasurface unit cell to adjust a level of destructive interference to the incident radiofrequency signal within the null region created by phase adjustment operation of the tunable delay circuit.

15. The information handling system of claim 14, wherein the chassis surface is a display chassis lid cover of the information handling system.

16. The information handling system of claim 14 further comprising:

the metasurface controller to send the bias voltage to the tunable delay circuit to phase shift the captured, incident radiofrequency signal to generate the reflected radiofrequency signal at a second metasurface unit cell for interference patterns in the incoming EM waves of the incident radiofrequency signal to create directional EM wave radiofrequency transmission or reception lobes within the EM waves of the incident radiofrequency signal on a second side of the information handling system.

17. The information handling system of claim 14 further comprising:

a plurality of antennas formed on a periphery of the metasurface unit cell array to transceive wireless data.

18. The information handling system of claim 14 further comprising:

a metal fixed tab formed within the passive set of concentric antennas.

19. The information handling system of claim 14 further comprising:

a signal matching circuit operatively coupled to each of the microwave circuits of the plurality of metasurface unit cells to match the impedance received from each of the plurality of microwave circuits prior to feeding the captured, incident radiofrequency signal to the tunable delay circuit for phase shifting.

20. The information handling system of claim 14 further comprising:

the hardware processor to execute computer-readable program code instructions of an adaptive mitigation system module to determine when the radiofrequency signal does not meet a sufficient radiofrequency signal communication threshold selected from a signal strength indicator (RSSI) threshold level from an RSSI sensor, a signal-to-interference-plus-noise ratio (SINR) threshold level from an SINR sensor, or a wireless bandwidth requirement level at the information handling system; and the metasurface controller to send the bias voltage to the tunable delay circuit to execute a step reduction in phase shift of the captured radiofrequency signal to generate a reflected radiofrequency signal at the first metasurface unit cell to create the interference patterns in the incoming EM waves of the incident radiofrequency signal to reduce the null region within the EM waves of the incident radiofrequency signal on the one side of the information handling system to improve radiofrequency signal communication.

* * * * *